United States Patent
Duan et al.

(10) Patent No.: US 12,375,241 B2
(45) Date of Patent: Jul. 29, 2025

(54) POSITIONING REFERENCE SIGNAL BANDWIDTH ADAPTATION FOR USER EQUIPMENT POWER SAVINGS

(71) Applicant: QUALCOMM Incorporated, San Diego, CA (US)

(72) Inventors: Weimin Duan, San Diego, CA (US); Hung Dinh Ly, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 18/002,299

(22) PCT Filed: Aug. 1, 2021

(86) PCT No.: PCT/US2021/044102
§ 371 (c)(1),
(2) Date: Dec. 19, 2022

(87) PCT Pub. No.: WO2022/046359
PCT Pub. Date: Mar. 3, 2022

(65) Prior Publication Data
US 2023/0353308 A1    Nov. 2, 2023

(30) Foreign Application Priority Data
Aug. 28, 2020  (GR) ............................... 20200100524

(51) Int. Cl.
*H04L 5/00*       (2006.01)

(52) U.S. Cl.
CPC ................................... *H04L 5/005* (2013.01)

(58) Field of Classification Search
None
See application file for complete search history.

(56) References Cited

U.S. PATENT DOCUMENTS

| | | | |
|---|---|---|---|
| 9,445,340 B2 | 9/2016 | Siomina | |
| 2018/0098300 A1* | 4/2018 | Venkatraman | ...... H04W 72/044 |
| 2020/0174466 A1* | 6/2020 | Zhang | ............... G05D 1/0088 |
| 2020/0274676 A1* | 8/2020 | Liu | .................. H04W 52/0206 |
| 2024/0015686 A1* | 1/2024 | Rao | ........................ H04W 64/00 |

FOREIGN PATENT DOCUMENTS

| | | |
|---|---|---|
| CN | 104322120 A | 1/2015 |
| CN | 110730056 A | 1/2020 |

OTHER PUBLICATIONS

International Search Report and Written Opinion—PCT/US2021/044102—ISA/EPO—Nov. 12, 2021.

(Continued)

*Primary Examiner* — Diane L Lo
(74) *Attorney, Agent, or Firm* — SUNSTEIN LLP

(57) ABSTRACT

Techniques are provided for reducing the bandwidth required to receive reference signals with a user equipment (UE). An example method for positioning reference signal bandwidth adaptation includes determining a target accuracy, determining a positioning reference signal bandwidth based on the target accuracy, and transmitting a positioning reference signal based on the positioning reference signal bandwidth.

30 Claims, 16 Drawing Sheets

(56) References Cited

OTHER PUBLICATIONS

Samsung: "DL and UL Reference Signals Design for NR Positioning", 3GPP Draft, 3GPP TSG RAN WG1 #96b, R1-1904394 NR Positioning DL and UL RS Design_SS, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 2, 2019 (Apr. 2, 2019), XP051707199, pp. 1-15, Sections 2, 3, 4, Abstract, Section 2.2.2, 2.4.

* cited by examiner

POSITIONING REFERENCE SIGNAL BANDWIDTH ADAPTATION FOR USER EQUIPMENT POWER SAVINGS

CROSS-REFERENCE TO RELATED APPLICATIONS

This application is the National Stage of International Application No. PCT/US2021/44102, filed Aug. 1, 2021, entitled "POSITIONING REFERENCE SIGNAL BANDWIDTH ADAPTATION FOR USER EQUIPMENT POWER SAVINGS," which claims the benefit of Greek Patent Application Ser. No. 20200100524, filed Aug. 28, 2020, entitled "POSITIONING REFERENCE SIGNAL BANDWIDTH ADAPTATION FOR USER EQUIPMENT POWER SAVINGS," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. Improvements in position related signaling may improve the efficiency of mobile devices.

SUMMARY

An example method for positioning reference signal bandwidth adaptation according to the disclosure includes determining a target accuracy, determining a positioning reference signal bandwidth based on the target accuracy, and transmitting a positioning reference signal based on the positioning reference signal bandwidth.

Implementations of such a method may include one or more of the following features. The positioning reference signal bandwidth may be associated with a positioning frequency layer. Determining the target accuracy may include determining a quality of service for positioning. Determining the target accuracy may include receiving the target accuracy from a network server. The method may include providing an indication of the positioning reference signal bandwidth to a user equipment. Providing an indication of the positioning reference signal bandwidth may include providing the indication in a downlink control information message or a medium access control (MAC) control element (CE). Determining the positioning reference signal bandwidth may include obtaining the positioning reference signal bandwidth from a data structure.

An example method for utilizing a positioning reference signal measurement bandwidth within a frequency layer according to the disclosure includes determining a target accuracy, determining the positioning reference signal measurement bandwidth based on the target accuracy, and transmitting a signal indicating the positioning reference signal measurement bandwidth.

Implementations of such a method may include one or more of the following features. Determining the target accuracy may include determining a quality of service for positioning. Determining the target accuracy may include receiving the target accuracy from a network server. Determining the target accuracy may include receiving the target accuracy from a user equipment. The frequency layer may be associated with a plurality of positioning reference signal measurement bandwidths and the signal indicating the positioning reference signal measurement bandwidth indicates one or the plurality of positioning reference signal measurement bandwidths. Transmitting the signal indicating the positioning reference signal measurement bandwidth may include providing an indication in a downlink control information message or a medium access control (MAC) control element (CE). Transmitting the signal indicating the positioning reference signal measurement bandwidth may include providing an indication of a bandwidth part. The method may include transmitting a positioning reference signal in a bandwidth that is larger than the positioning reference signal measurement bandwidth. A positioning reference signal may be transmitted in a bandwidth that is equal to the positioning reference signal measurement bandwidth. Transmitting the signal indicating the positioning reference signal measurement bandwidth may include providing an indication of one of a plurality of pre-designated positioning reference signal measurement bandwidths. Transmitting the signal indicating the positioning reference signal measurement bandwidth may include providing an indication of a size of a variable positioning reference signal measurement bandwidth. A timing measurement quality and an indication of a current positioning reference signal measurement bandwidth may be received from a user equipment.

An example method of obtaining positioning measurements according to the disclosure includes receiving a signal indicating a positioning reference signal measurement bandwidth, receiving one or more positioning reference signals, and obtaining a positioning measurement for at least one of the one or more positioning reference signals based at least in part on the positioning reference signal measurement bandwidth.

Implementations of such a method may include one or more of the following features. Receiving the signal indicating the positioning reference signal measurement bandwidth may include receiving an indication in a downlink control information message or a medium access control (MAC) control element (CE). Receiving the signal indicating the positioning reference signal measurement bandwidth may include receiving an indication of a bandwidth part. The one or more positioning reference signals may have a bandwidth that is larger than the positioning reference signal measurement bandwidth. The one or more positioning reference signals may have a bandwidth that is equal to the positioning reference signal measurement bandwidth. Receiving the signal indicating the positioning reference signal measurement bandwidth may include receiving an indication of one of a plurality of pre-designated positioning reference signal measurement bandwidths. Receiving the signal indicating the positioning reference signal measurement bandwidth may include receiving an indication of a size of a variable positioning reference signal measurement bandwidth. The method may include transmitting a timing measurement quality and an indication of a current positioning reference signal measurement bandwidth to a base station. The positioning reference signal measurement bandwidth and the one or more positioning reference signals may be associated with a frequency layer. A quality of service indication may be transmitted to a base station.

An example apparatus according to the disclosure includes a memory, at least one transceiver, at least one processor communicatively coupled to the memory and the at least one transceiver and configured to determine a target accuracy, determine a positioning reference signal bandwidth based on the target accuracy, and transmit a positioning reference signal based on the positioning reference signal bandwidth.

Implementations of such an apparatus may include one or more of the following features. The positioning reference signal bandwidth may be associated with a positioning frequency layer. The at least one processor may be further configured to determine a quality of service for positioning. The at least one processor may be further configured to receive the target accuracy from a network server. The at least one processor may be further configured to provide an indication of the positioning reference signal bandwidth to a user equipment. The at least one processor may be further configured to provide the indication in a downlink control information message or a medium access control (MAC) control element (CE). The at least one processor may be further configured to obtain the positioning reference signal bandwidth from a data structure.

An example apparatus according to the disclosure includes a memory, at least one transceiver, at least one processor communicatively coupled to the memory and the at least one transceiver and configured to determine a target accuracy, determine a positioning reference signal measurement bandwidth based on the target accuracy, and transmit a signal indicating the positioning reference signal measurement bandwidth.

Implementations of such an apparatus may include one or more of the following features. The at least one processor may be further configured to determine a quality of service for positioning. The at least one processor may be further configured to receive the target accuracy from a network server. The at least one processor may be further configured to receive the target accuracy from a user equipment. A frequency layer may be associated with a plurality of positioning reference signal measurement bandwidths and the signal indicating the positioning reference signal measurement bandwidth may indicate one or the plurality of positioning reference signal measurement bandwidths. The at least one processor may be further configured to provide an indication in a downlink control information message or a medium access control (MAC) control element (CE). The at least one processor may be further configured to provide an indication of a bandwidth part. The at least one processor may be further configured to transmit a positioning reference signal in a bandwidth that is larger than the positioning reference signal measurement bandwidth. The at least one processor may be further configured to transmit a positioning reference signal in a bandwidth that is equal to the positioning reference signal measurement bandwidth. The at least one processor may be further configured to provide an indication of one of a plurality of pre-designated positioning reference signal measurement bandwidths. The at least one processor may be further configured to provide an indication of a size of a variable positioning reference signal measurement bandwidth. The at least one processor may be further configured to receive a timing measurement quality and an indication of a current positioning reference signal measurement bandwidth from a user equipment.

An example apparatus according to the disclosure includes a memory, at least one transceiver, at least one processor communicatively coupled to the memory and the at least one transceiver and configured to receive a signal indicating a positioning reference signal measurement bandwidth, receive one or more positioning reference signals, and obtain a positioning measurement for at least one of the one or more positioning reference signals based at least in part on the positioning reference signal measurement bandwidth.

Implementations of such an apparatus may include one or more of the following features. The at least one processor may be further configured to receive an indication in a downlink control information message or a medium access control (MAC) control element (CE). The at least one processor may be further configured to receive an indication of a bandwidth part. The one or more positioning reference signals may have a bandwidth that is larger than the positioning reference signal measurement bandwidth. The one or more positioning reference signals may have a bandwidth that is equal to the positioning reference signal measurement bandwidth. The at least one processor may be further configured to receive an indication of one of a plurality of pre-designated positioning reference signal measurement bandwidths. The at least one processor may be further configured to receive an indication of a size of a variable positioning reference signal measurement bandwidth. The at least one processor may be further configured to transmit a timing measurement quality and an indication of a current positioning reference signal measurement bandwidth to a base station. The positioning reference signal measurement bandwidth and the one or more positioning reference signals may be associated with a frequency layer. The at least one processor may be further configured to transmit a quality of service indication to a base station.

An example apparatus for positioning reference signal bandwidth adaptation according to the disclosure includes means for determining a target accuracy, means for determining a positioning reference signal bandwidth based on the target accuracy, and means for transmitting a positioning reference signal based on the positioning reference signal bandwidth.

An example apparatus for utilizing a positioning reference signal measurement bandwidth within a frequency layer according to the disclosure includes means for determining a target accuracy, means for determining the positioning reference signal measurement bandwidth based on the target accuracy, and means for transmitting a signal indicating the positioning reference signal measurement bandwidth.

An example apparatus of obtaining positioning measurements according to the disclosure includes means for receiving a signal indicating a positioning reference signal measurement bandwidth, means for receiving one or more positioning reference signals, and means for obtaining a positioning measurement for at least one of the one or more positioning reference signals based at least in part on the positioning reference signal measurement bandwidth.

An example non-transitory processor-readable storage medium comprising processor-readable instructions configured to cause one or more processors to adapt a positioning reference signal bandwidth according to the disclosure includes code for determining a target accuracy, code for determining a positioning reference signal bandwidth based on the target accuracy, and code for transmitting a positioning reference signal based on the positioning reference signal bandwidth.

An example non-transitory processor-readable storage medium comprising processor-readable instructions configured to cause one or more processors to utilize a positioning reference signal measurement bandwidth within a frequency layer according to the disclosure includes code for determining a target accuracy, code for determining the positioning reference signal measurement bandwidth based on the target accuracy, and code for transmitting a signal indicating the positioning reference signal measurement bandwidth.

An example non-transitory processor-readable storage medium comprising processor-readable instructions configured to cause one or more processors to obtain positioning measurements according to the disclosure includes code for receiving a signal indicating a positioning reference signal measurement bandwidth, code for receiving one or more positioning reference signals, and code for obtaining a positioning measurement for at least one of the one or more positioning reference signals based at least in part on the positioning reference signal measurement bandwidth.

Items and/or techniques described herein may provide one or more of the following capabilities, as well as other capabilities not mentioned. A frequency layer may be configured with one or more positioning reference signal (PRS) bandwidths. PRS resources may be transmitted using the PRS bandwidth. The accuracy of a positioning measurement may be proportional to the PRS bandwidth. The PRS bandwidth may be adapted based on a positioning quality of service requirement. A user equipment may be configured with a PRS measurement bandwidth. The PRS measurement bandwidth may be adapted based on a positioning quality of service requirement. Reductions in the PRS bandwidth and/or the PRS measurement bandwidth may reduce the power required by a receiver in the user equipment. The reduction in power may increase the power efficiency of the user equipment. Other capabilities may be provided and not every implementation according to the disclosure must provide any, let alone all, of the capabilities discussed.

DETAILED DESCRIPTION

Techniques are discussed herein for reducing the bandwidth required to receive reference signals with a user equipment (UE). Base stations may be configured to transmit reference signals, such as positioning reference signals (PRS) in one or more bands. The bands may be in different frequency layers and may include different component carriers. A base station may be configured with one or more PRS resource sets associated with a positioning frequency layer. The bandwidths of the PRS resources may vary in different positioning frequency layers. In general, the accuracy of a positioning measurement increases proportionally with the bandwidth of the PRS. The power required to receive a PRS may also increase with increasing bandwidth. In an example, the base station may select a frequency layer, and the corresponding PRS bandwidth, based on a positioning accuracy requirement for the UE. The bandwidth of the PRS transmitted by one or more base stations, and received by the UE, may vary based on the accuracy required by an application. In another example, the UE may be configured to receive only a portion of a PRS with a PRS measurement bandwidth. The UE may include a plurality of different PRS measurement bandwidths with each of the PRS measurements bandwidths enabling a different measurement accuracy. For example, a larger PRS measurement bandwidth may provide more accurate measurements as compared to a smaller PRS measurement bandwidth. The selection of a PRS measurement bandwidth may be based on application requirements and/or network signaling. The reduction of PRS bandwidths in the frequency layers and the PRS measurement bandwidths may reduce the power required by a UE to receive PRS. The power reduction may increase the efficiency of the UE and extend the operational time on a battery charge. These techniques and configurations are examples, and other techniques and configurations may be used.

Figure 1:
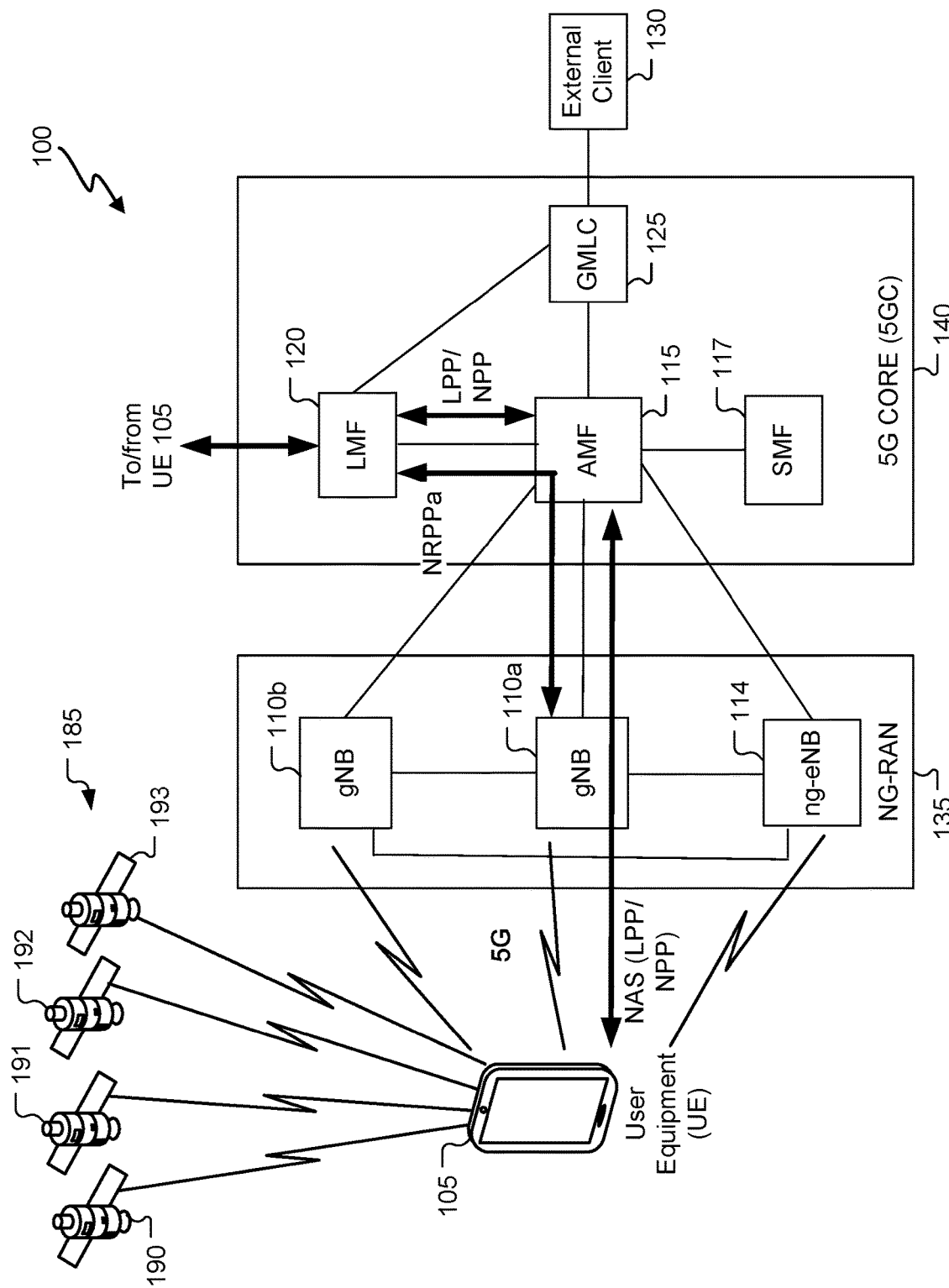
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs (e.g., gNB 110*a*, gNB 110*b*, ng-eNB 114) may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-U IRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
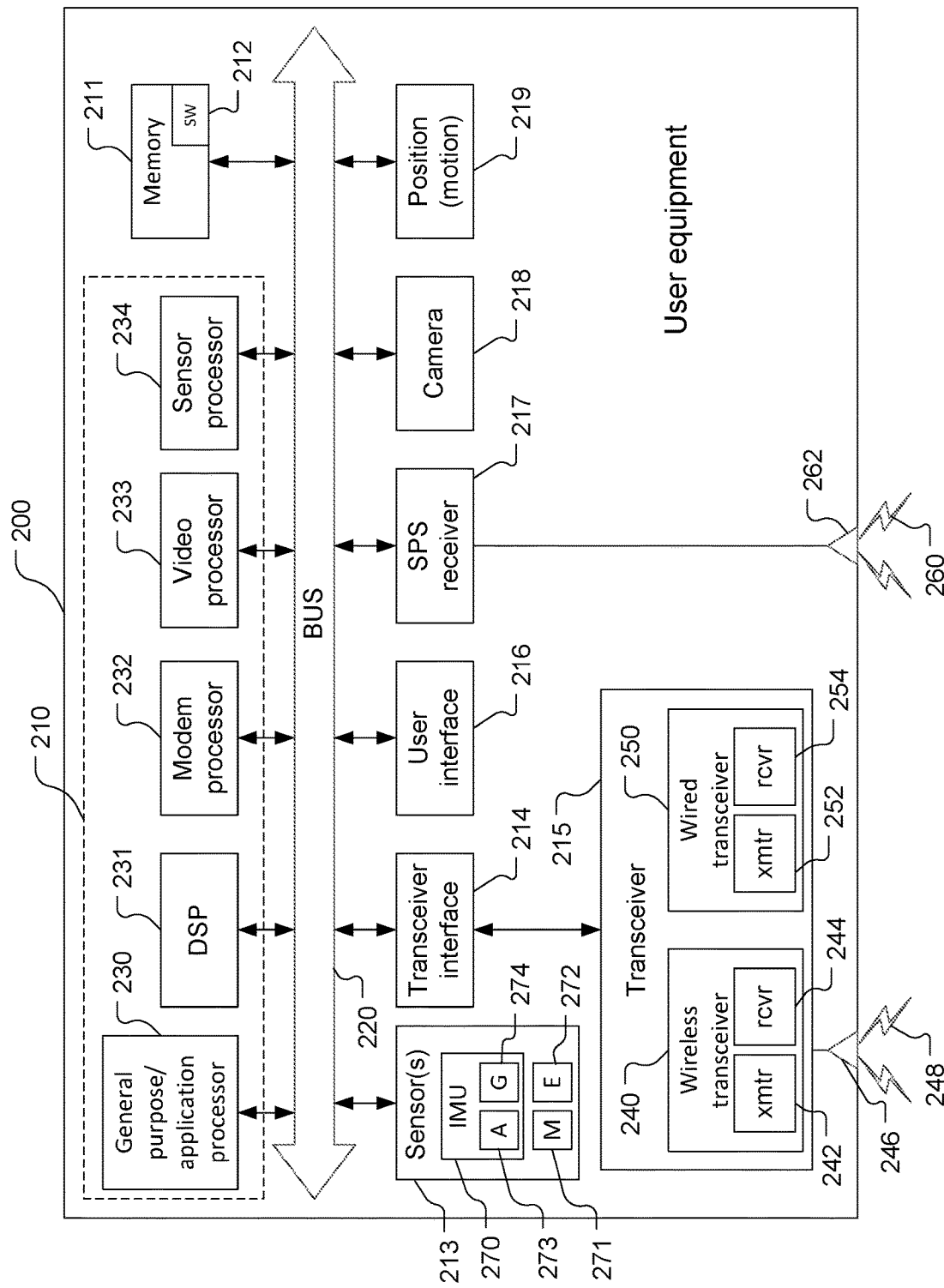
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device (PMD) 219. The processor 210, the memory 211, the sensor(s) 213, the transceiver interface 214, the user interface 216, the SPS receiver 217, the camera 218, and the position (motion) device (PMD) 219 may be communicatively coupled to each other by a bus 220 (which may be configured, e.g., for optical and/or electrical communication). One or more of the shown apparatus (e.g., the camera 218, the position (motion) device (PMD) 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X) (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
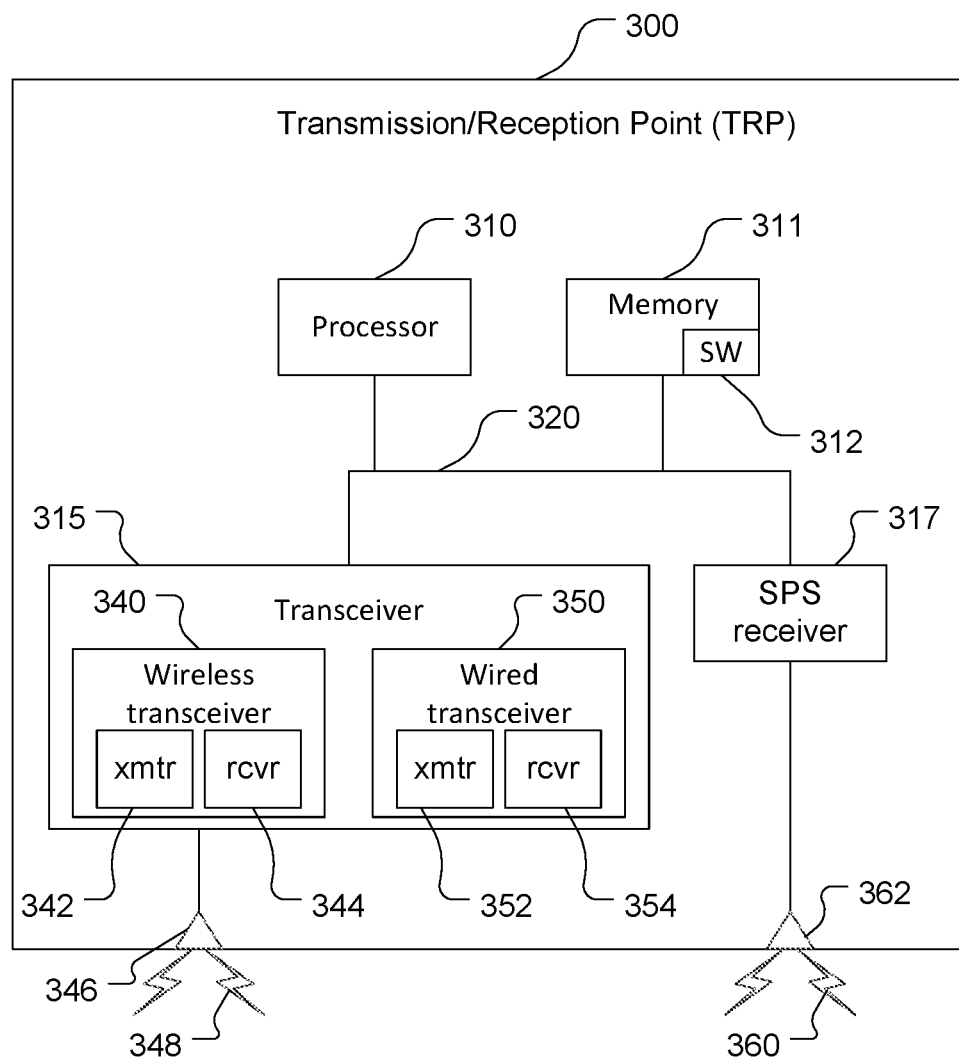
FIG. 3 is a block diagram of components of an example transmission/reception point shown in FIG. 1.

Referring also to FIG. 3, an example of a TRP 300 of the BSs (e.g., gNB 110a, gNB 110b, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels, downlink channels, and/or sidelink channels) and/or receiving (e.g., on one or more downlink channels, uplink channels, and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
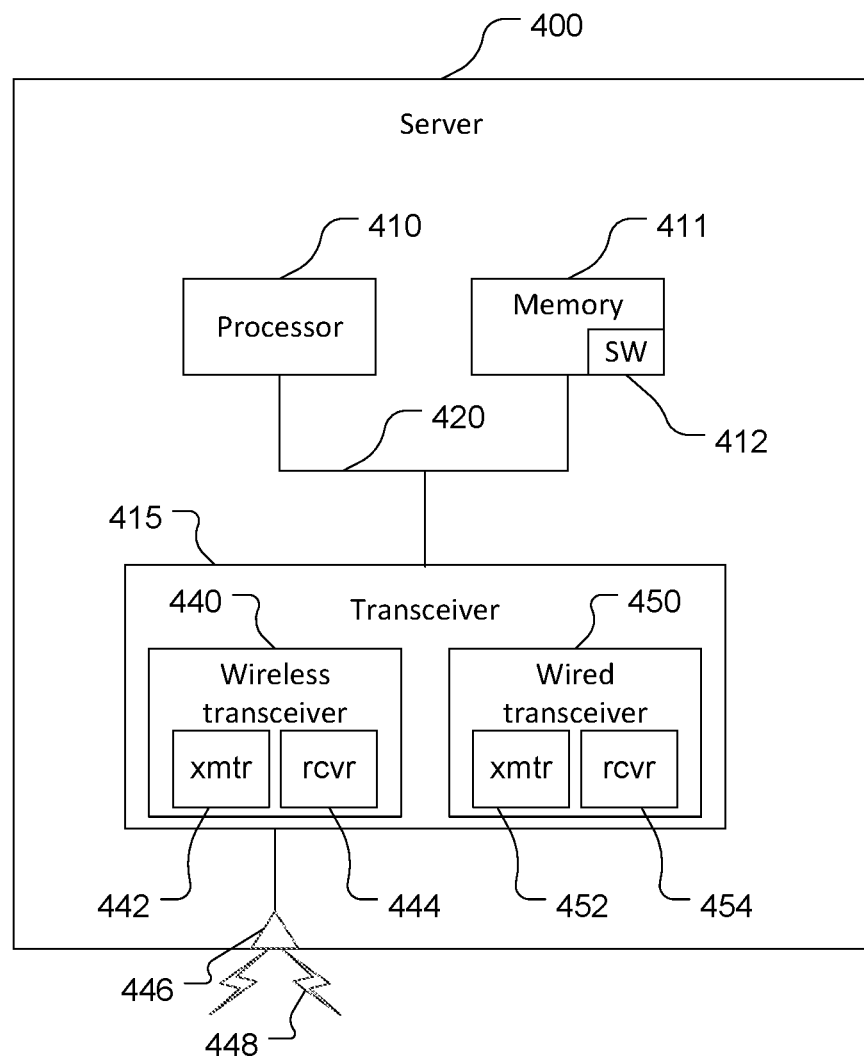
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figures 5A, 5B:
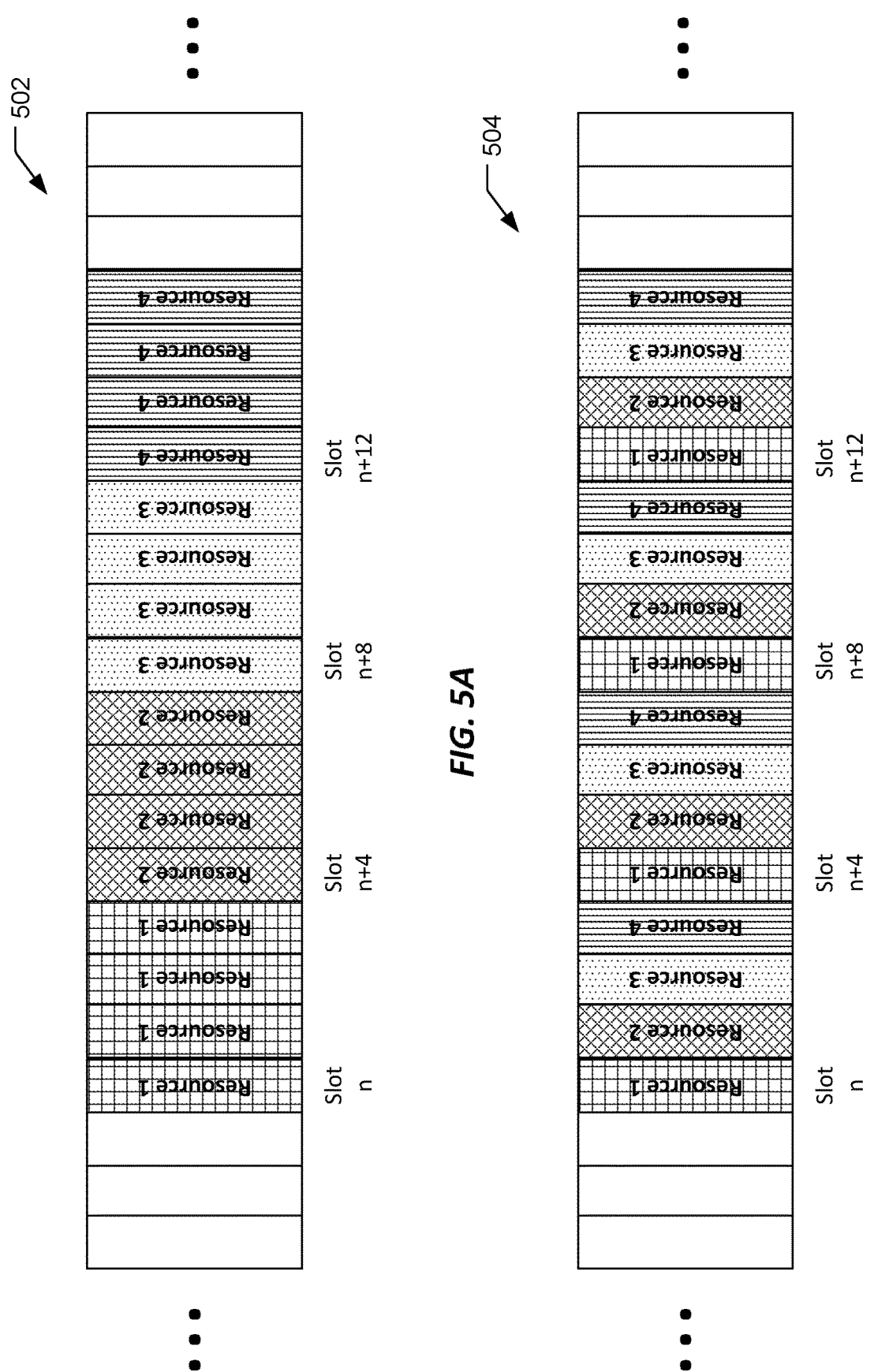
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
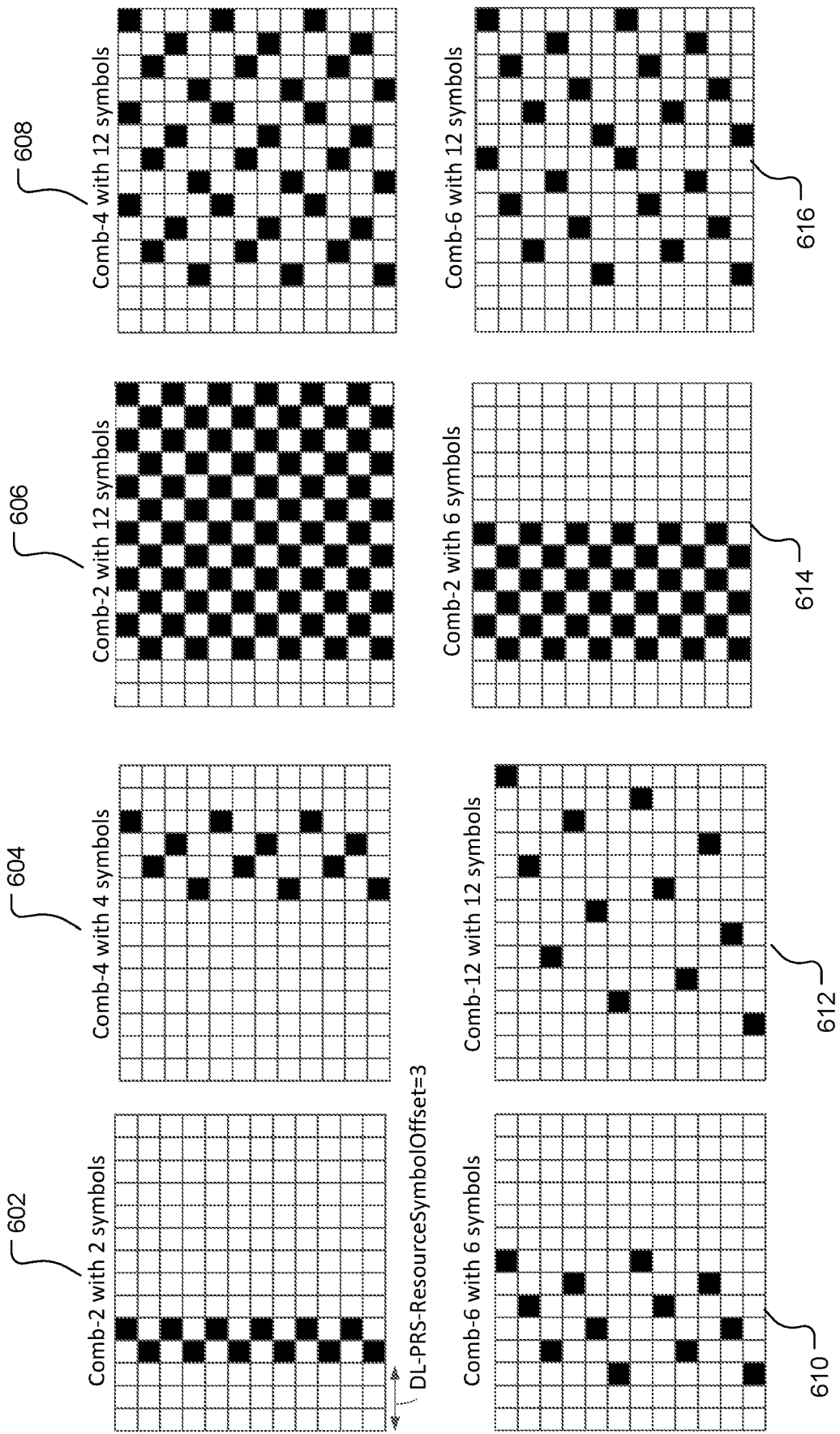
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
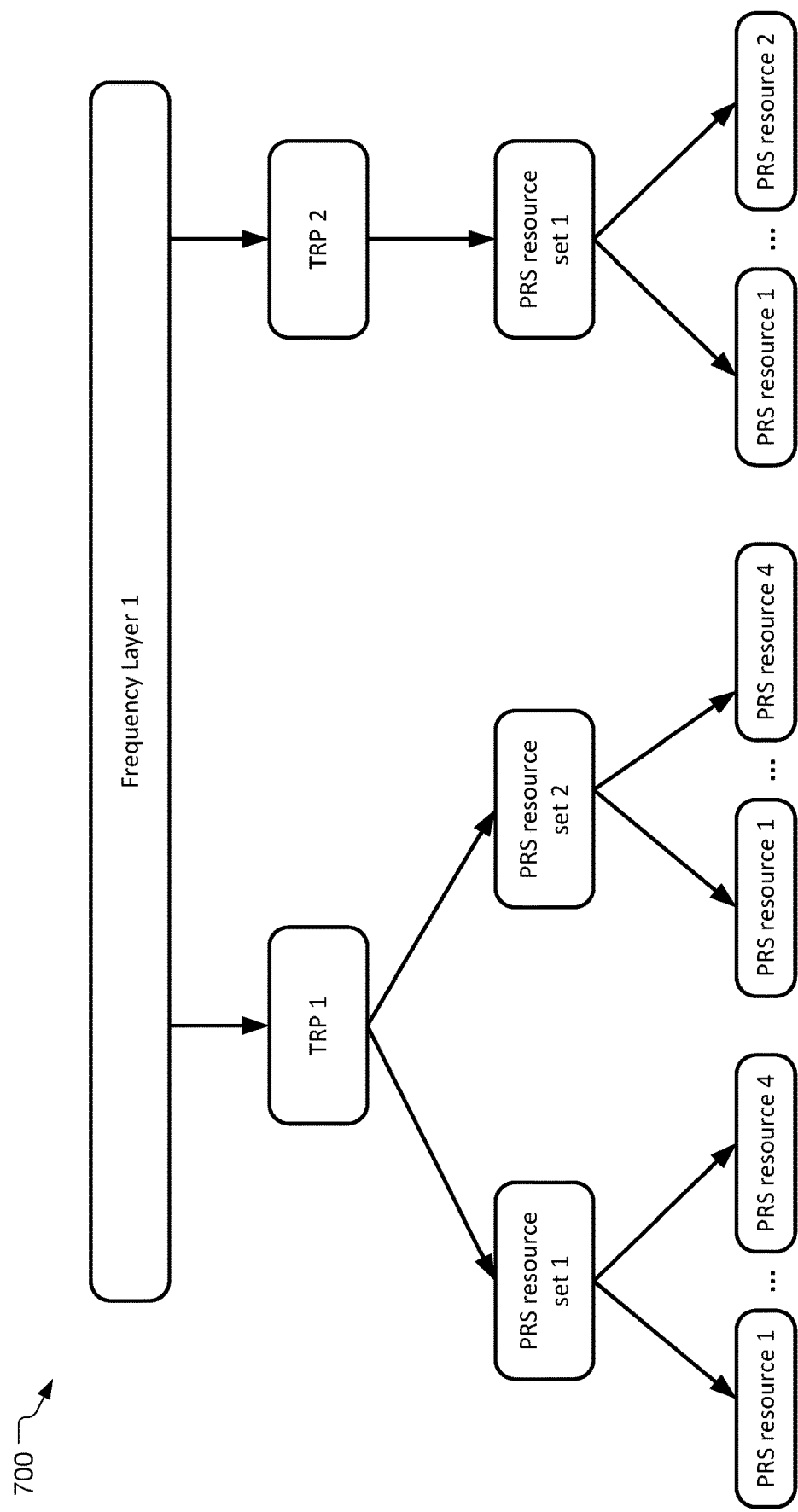
FIG. 7 is a diagram of an example frequency layer.

Referring to FIG. 7, a diagram of an example frequency layer 700 is shown. In an example, the frequency layer 700 also referred to as a positioning frequency layer, may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

A UE 200 may be configured to operate in different use cases and/or applications which may require different accuracy requirements. For example, in regulatory use cases, target accuracy requirements (e.g., 3GPP Release 16) may include a horizontal positioning error less than or equal to 50 m for 80% of UEs, a vertical positioning error of less than 5 m for 80% of UEs, and an end to end latency and TTFF of less than 30 seconds. Commercial use cases may require more accurate positioning. As examples, and not limitations, RAT dependent solutions may require a horizontal positioning error of less than 3 m for 80% of UEs in indoor deployment scenarios, a vertical positioning error of less than 3 m for 80% of UEs in indoor deployment scenarios, a horizontal positioning error of less than 10 m for 80% of UEs in outdoor deployments scenarios, a vertical positioning error of less than 3 m for 80% of UEs in outdoor deployment scenarios, and an end to end latency of less than 1 s. These accuracy requirements are examples and may change based on industry standards and capabilities of the user equipment.

In operation, a mobile UE may switch environments between indoor and outdoor, and the target accuracy may depend on its use cases. In an example, one mobile UE may be configured to support multiple use cases at different times with different accuracy requirements. For example, a smartphone may be used for navigation in an outdoor environment with a media positioning accuracy requirement of less than 5 m, and then used for indoor navigation with a higher accuracy requirement (e.g., less than 1 m). In general, the PRS bandwidth is proportional to the target positioning accuracy (i.e., the higher PRS bandwidth, the higher the target accuracy).

In an example, the PRS bandwidth adaptation techniques described herein may be used to select a positioning frequency layer, and the corresponding PRS bandwidth, based on use cases and UE operating scenarios. A reduction in PRS bandwidth may result in reduced UE power consumption. In another example, PRS adaptation techniques may be used to vary a UE's PRS measurement bandwidth. The PRS measurement bandwidth may be dynamically configured and may be smaller than the PRS bandwidth defined in a frequency layer. A UE may utilize a PRS measurement bandwidth based on a target accuracy and/or measurement quality and realize power savings based on the corresponding reduction in bandwidth.

Figure 8A:
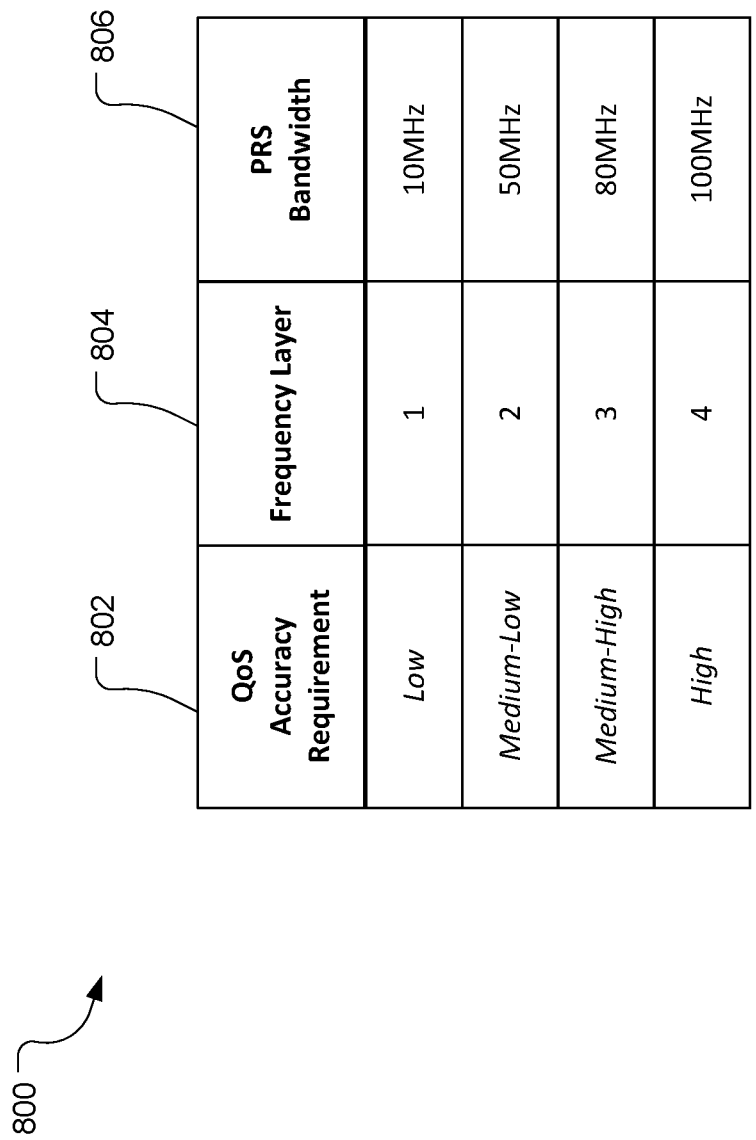
FIG. 8A is an example data structure for correlating a positioning reference signal bandwidth and a quality of service.

Referring to FIG. 8A, an example data structure 800 for correlating a positioning reference signal bandwidth and a quality of service is shown. The data structure 800 is an example, and not a limitation, as other data structures, data fields, functions and operations may be used to select a PRS bandwidth based on an accuracy requirement. In operation, the positioning frequency layer 700 may be configured with a PRS bandwidth which is propagated to the PRS resource sets and the PRS resources within the frequency layer. The data structure 800 includes a frequency layer column 804 containing the identification values of four positioning frequency layers, and a corresponding PRS bandwidth 806 indicating the corresponding PRS bandwidths in the positioning frequency layers. The positioning frequency identification values and the PRS bandwidth values are examples. Other bandwidths and identities may be used. The data structure 800 includes a Quality of Service (QoS) Accuracy Requirement column 802 with example accuracy requirement levels (e.g., low, medium-low, medium-high, high). The accuracy requirements are examples to facilitate describing the concepts of PRS bandwidth adaptation. In operation, the accuracy requirements may be defined by a distance (e.g., 3 m, 5 m, 10 m, 50 m, etc.). In an example, the accuracy requirement may correspond to an information element in a QoS object in a network specification (e.g., TS 37.355 CommonIEsRequestLocationInformation fields). The data structure 800, or equivalent information elements, may persist in the NG-RAN 135 (e.g., gNB 110a) and/or within the network 140 (e.g., the LMF 120).

The communication system 100 may be configured to utilize QoS to provide different priorities to applications, users, or data flows, or to enable levels of performance to a data flow. For example, different applications may require different target accuracies. The communication system 100 may be configured to allocate the PRS bandwidth based on the target accuracy. In an example, different PRS bandwidths may be associated with different positioning frequency layers. Different use cases with different target accuracies may utilize different PRS bandwidths. A service with a higher target accuracy may request a larger PRS bandwidth allocation. When a UE switches from a use case with a higher target accuracy to a use case with a lower target accuracy, the communication system 100 may configure the PRS with a narrower bandwidth. The reduction in PRS bandwidth may enable power savings because the receive chains on the UE may require less power to receive a narrow bandwidth. In an embodiment, the PRS bandwidth may be dynamically indicated to the UE 105 via a serving cell (e.g., gNB 110a) through the PRS re-configuration by the LMF 120 via LPP messages, or via Downlink Control Information (DCI) and/or Medium Access Control (MAC) Control Element (CE) based triggering, or other signaling such as Radio Resource Control (RRC) messaging.

Figure 8B:
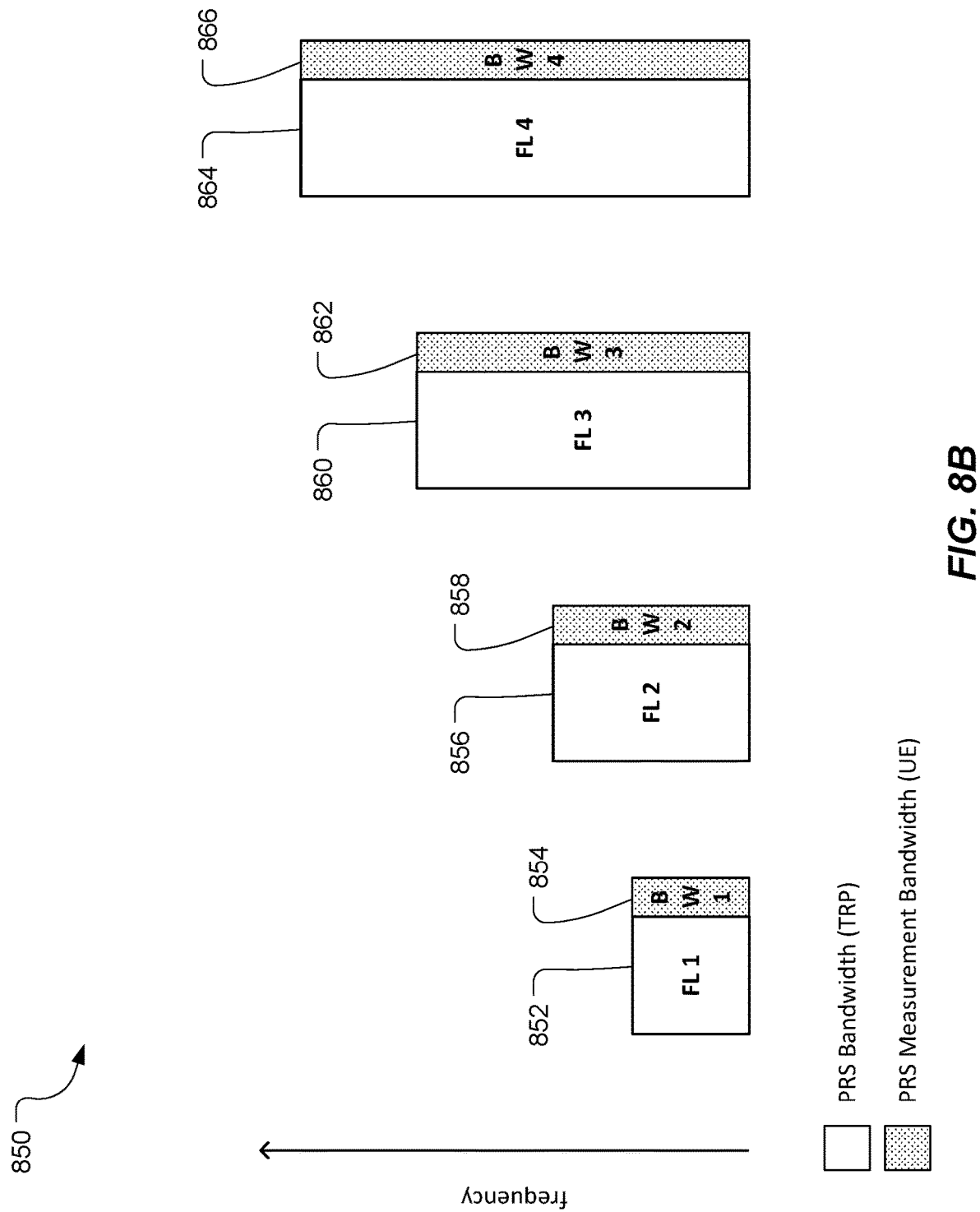
FIG. 8B is an illustration of example positioning reference signal bandwidths and positioning reference signal measurement bandwidths.

Referring to FIG. 8B, an illustration 850 of example PRS bandwidths and PRS measurement bandwidths is shown. The illustration 850 includes four example PRS bandwidths in a first positioning frequency layer 852, a second positioning frequency layer 856, a third positioning frequency layer 860, and a fourth positioning frequency layer 864. The PRS bandwidths in the frequency layers represent the bandwidths of PRS indicated in the data structure 800 and transmitted by the TRP 300 or other stations. The illustration 850 also includes examples of PRS measurement bandwidths configured on a UE 200. The PRS measurement bandwidths including a first PRS measurement bandwidth 854, a second PRS measurement bandwidth 858, a third PRS measurement bandwidth 862, and a fourth PRS measurement bandwidth 866. The sizes of the PRS bandwidths and the PRS measurement bandwidths are examples as other sizes may be used based on network accuracy requirements and UE capabilities. Current network specifications support up to four positioning frequency layers, with each positioning frequency layer configured with a specific PRS bandwidth. Future specifications may enable additional positioning frequency layers and the corresponding PRS bandwidths. In operation, the communication system 100 may activate a positioning frequency layer based on QoS and/or accuracy requirements, and the UE 200 may be configured to utilize a PRS measurement bandwidth which corresponds to the PRS bandwidth. For example, the first PRS measurement bandwidth 854 may be used with the first positioning frequency layer 852, the second PRS measurement bandwidth 858 may be used with the second positioning frequency layer 856, third PRS measurement bandwidth 862 may be used with the third positioning frequency layer 860, and the fourth PRS measurement bandwidth 866 may be used with the fourth positioning frequency layer 864.

Figure 9:
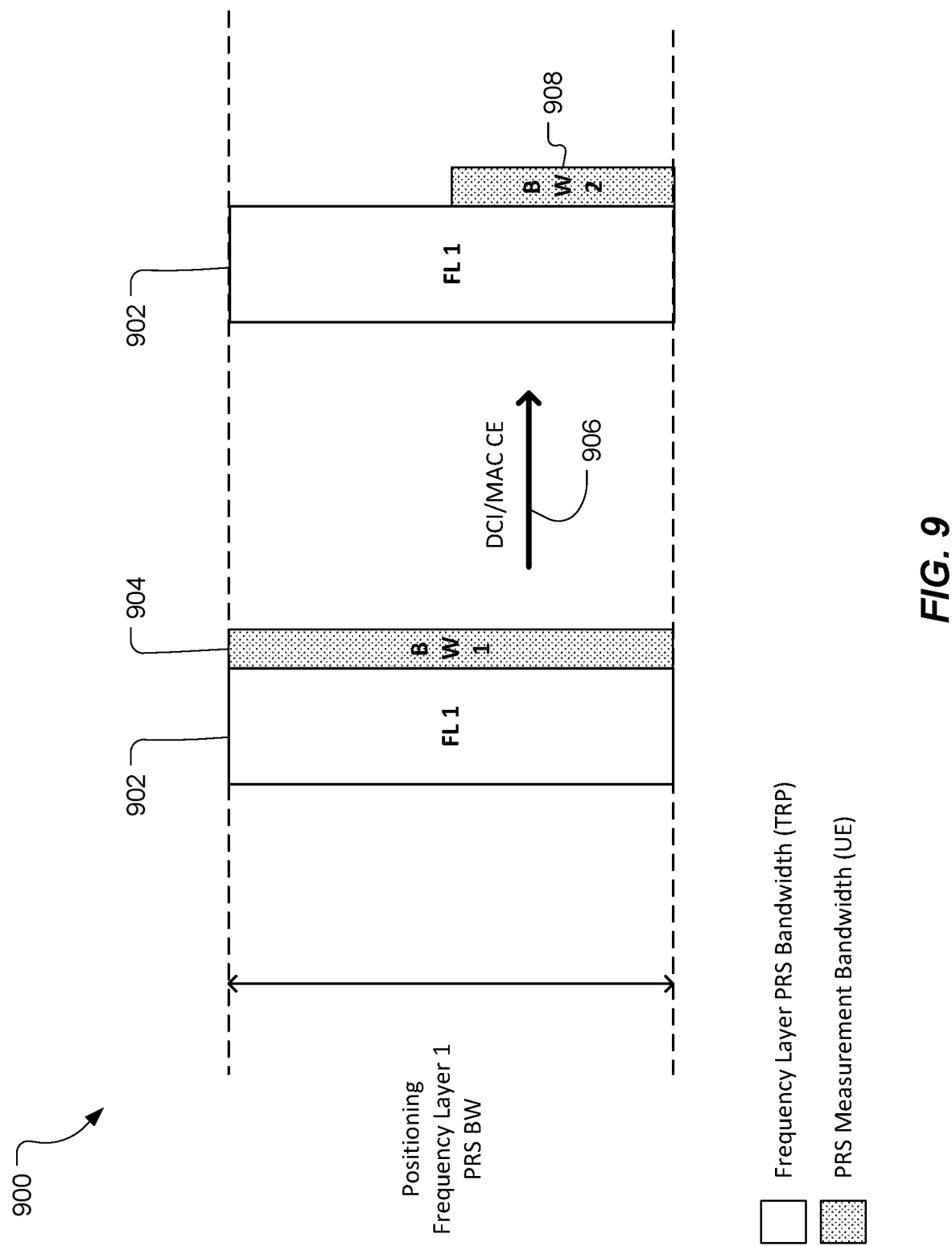
FIG. 9 is a diagram of an example adaptation of a positioning reference signal measurement bandwidth within a frequency layer.

Referring to FIG. 9, a diagram 900 of an example adaptation of a PRS measurement bandwidth within a frequency layer is shown. In an embodiment, the communication system 100 may pre-configure a set of PRS measurement bandwidths for each frequency layer, and may dynamically indicate to the UE 200 which PRS measurement to be used. In an embodiment, different PRS measurement bandwidths on the UE 200 may be triggered by DCI and/or MAC CE messages. For example, referring to the diagram 900, the TRP 300 may transmit PRS based on the PRS bandwidth in a first positioning frequency layer 902. The UE 200 may utilize a first PRS measurement bandwidth 904 to measure the PRS. The first PRS measurement bandwidth 904 may have substantially the same bandwidth as the PRS bandwidth in the first positioning frequency layer 902. The network may detect a change of status for the UE 200 (e.g., moving from indoors to outdoors) and determine that lower positioning accuracy requirements may be enabled. The network (e.g., gNB 110a) may provide low level signaling 906 such as DCI, MAC CE, RRC, or other signaling, configured to enable the UE 200 to reduce the size of the PRS measurement bandwidth. For example, the UE 200 may utilize a second PRS measurement bandwidth 908 which is smaller than the PRS bandwidth in the first positioning frequency layer 902. The reduction in PRS measurement bandwidth enables the UE 200 to reduce the power to the receiver 244 and thus may enable power savings. While the PRS bandwidth of the first positioning frequency layer 902 and the second PRS measurement bandwidth 908 are depicted with the same lower boundary, the second PRS measurement bandwidth 908 may be located at other locations within the PRS bandwidth of the first positioning frequency layer 902. In an example, legacy bandwidth part (BWP) based switching may be used to change the size of a PRS measurement bandwidth.

In an embodiment, the UE 200 may be configured to report PRS timing measurement qualities for a current positioning frequency layer and the current PRS measurement bandwidth. The UE 200 may provide the measurement qualities for various combinations of positioning frequency PRS bandwidths and PRS measurement bandwidths. In an example, when a measurement quality is high, the network may be configured to indicate to the UE 200 to switch to a lower PRS measurement bandwidth to conserve power. The UE 200 may be configured to utilize a lower PRS measurement bandwidth if it is sufficient to meet an accuracy requirement, or to increase the PRS measurement bandwidth if higher accuracy is required.

Figure 10:
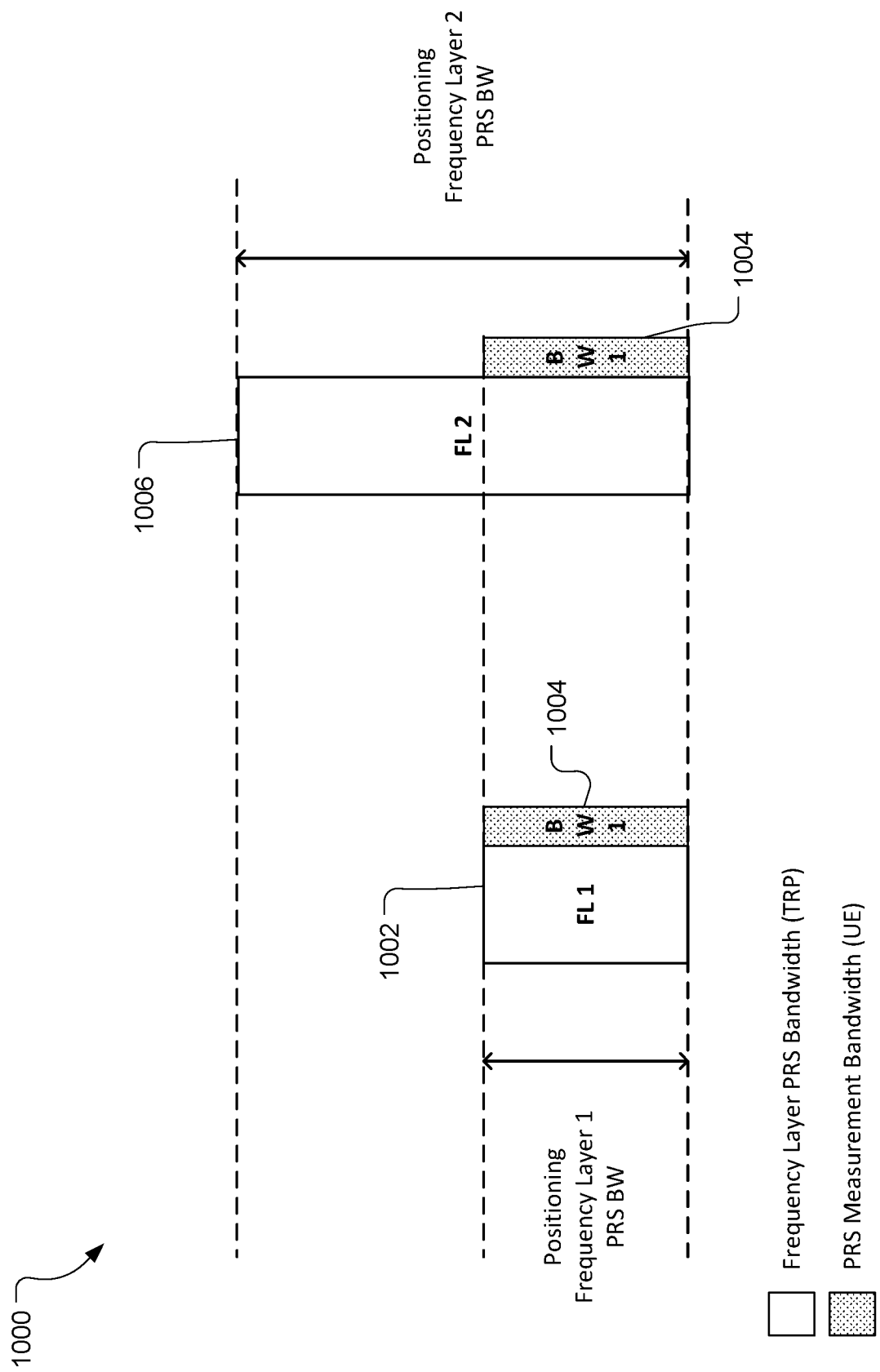
FIG. 10 is a diagram of an example adaptation of a positioning reference signal measurement bandwidth across different frequency layers.

Referring to FIG. 10, a diagram 1000 of an example adaptation of a PRS measurement bandwidth across different frequency layers is shown. The diagram 1000 includes a first PRS bandwidth 1002 in a first positioning frequency layer and a second PRS bandwidth 1006 in a second frequency layer. The UE 200 is configured with at least a first PRS measurement bandwidth 1004, which may be used in the first or second frequency layers. In an embodiment, the UE 200 may be expected to process one frequency layer at a time (e.g. to support legacy configurations), and the UE 200 may need to switch the PRS measurement bandwidth when the UE 200 switches the frequency layer. In an example, when the PRS bandwidth is larger in the new frequency layer (e.g., the second PRS bandwidth 1006 is larger than the first PRS bandwidth 1002), the UE 200 may be configured to maintain the PRS measurement bandwidth (e.g., the first PRS measurement bandwidth 1004), in the new frequency layer. That is, the UE 200 may still meet the target measurement quality/accuracy based on the smaller PRS measurement bandwidth, even if the PRS bandwidth is larger in the new frequency layer. In another example, the UE 200 may be configured to increase the PRS measurement bandwidth in the new and larger second PRS bandwidth. The UE 200 may be configured to switch the PRS measurement bandwidth to a larger pre-configured PRS measurement bandwidth in the new frequency layer if the measurement quality in the frequency layer is low. The PRS measurement bandwidth switch could be triggered based on DCI, MAC CE, or other signaling provided by the network. In an example, the UE 200 may be configured to switch the PRS measurement bandwidth based on a local application.

Figure 11A:
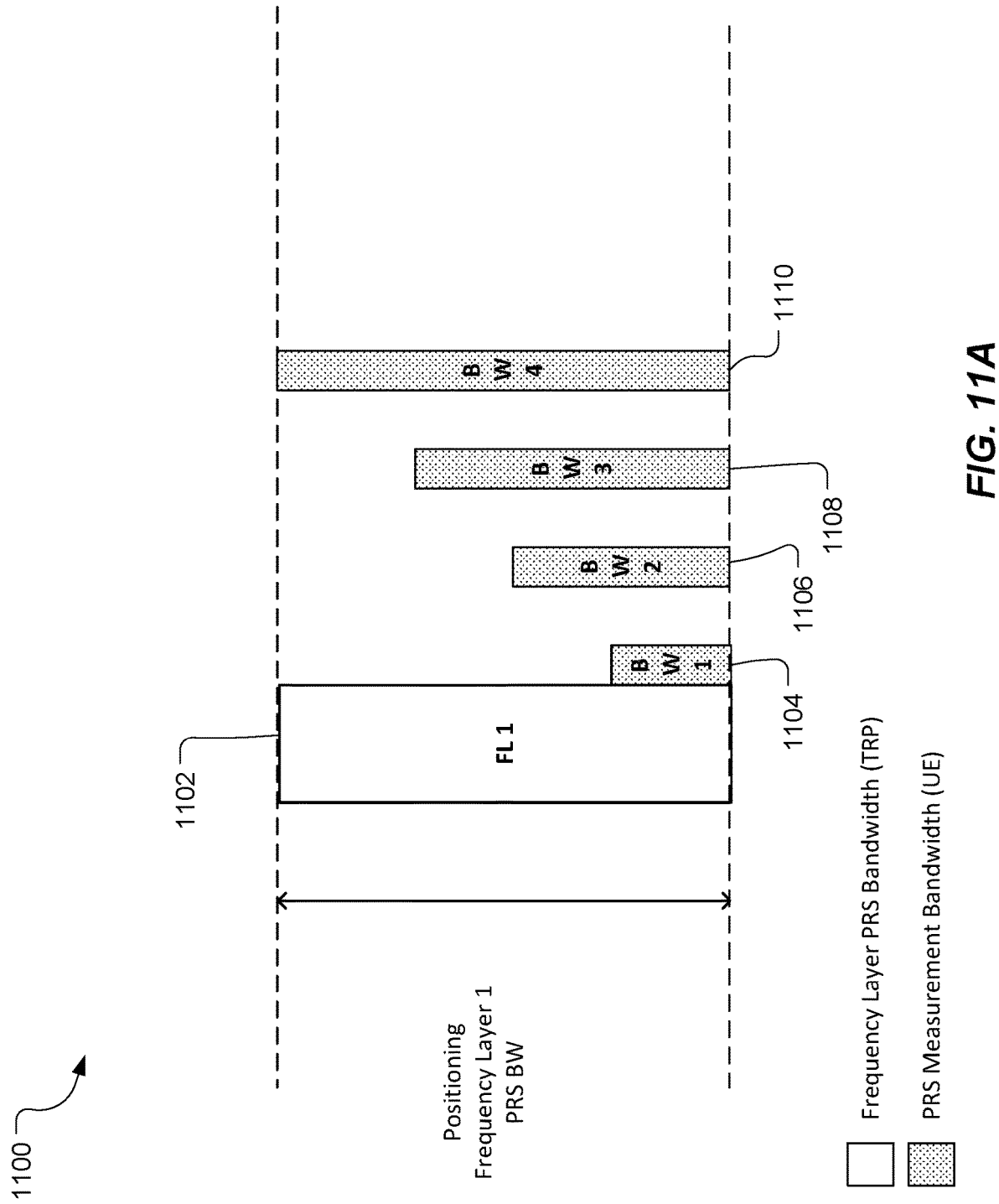
FIG. 11A is a diagram of multiple examples of discrete positioning reference signal measurement bandwidths within a frequency layer.

Referring to FIG. 11A, a diagram 1100 of multiple examples of discrete PRS measurement bandwidths within a frequency layer are shown. The diagram 1100 includes a PRS bandwidth 1102 in a first frequency layer and four PRS measurement bandwidths including a first PRS measurement bandwidth 1104, a second PRS measurement bandwidth 1106, a third PRS measurement bandwidth 1108, and a fourth PRS measurement bandwidth 1110. The number and sizes of the PRS measurement bandwidths 1104, 1106, 1108, 1110 are examples and not limitations as various numbers and sizes may be used. The PRS measurement bandwidths 1104, 1106, 1108, 1110 may represent pre-designated PRS measurement bandwidths which may be activated based on two bits in a low level signaling message (e.g., DCI, MAC CE). Other signaling may also be used to activate a PRS measurement bandwidth. Industry standards may determine the number and size of the PRS measurement bandwidths 1104, 1106, 1108, 1110. In an example, the standard may enable four PRS measurement bandwidths with sizes selected from 5, 10, 20, 40, 50, 80, and 100 MHz in the FR1 band, and 50, 100, 200, 400 MHz in the FR2 band.

Figure 11B:
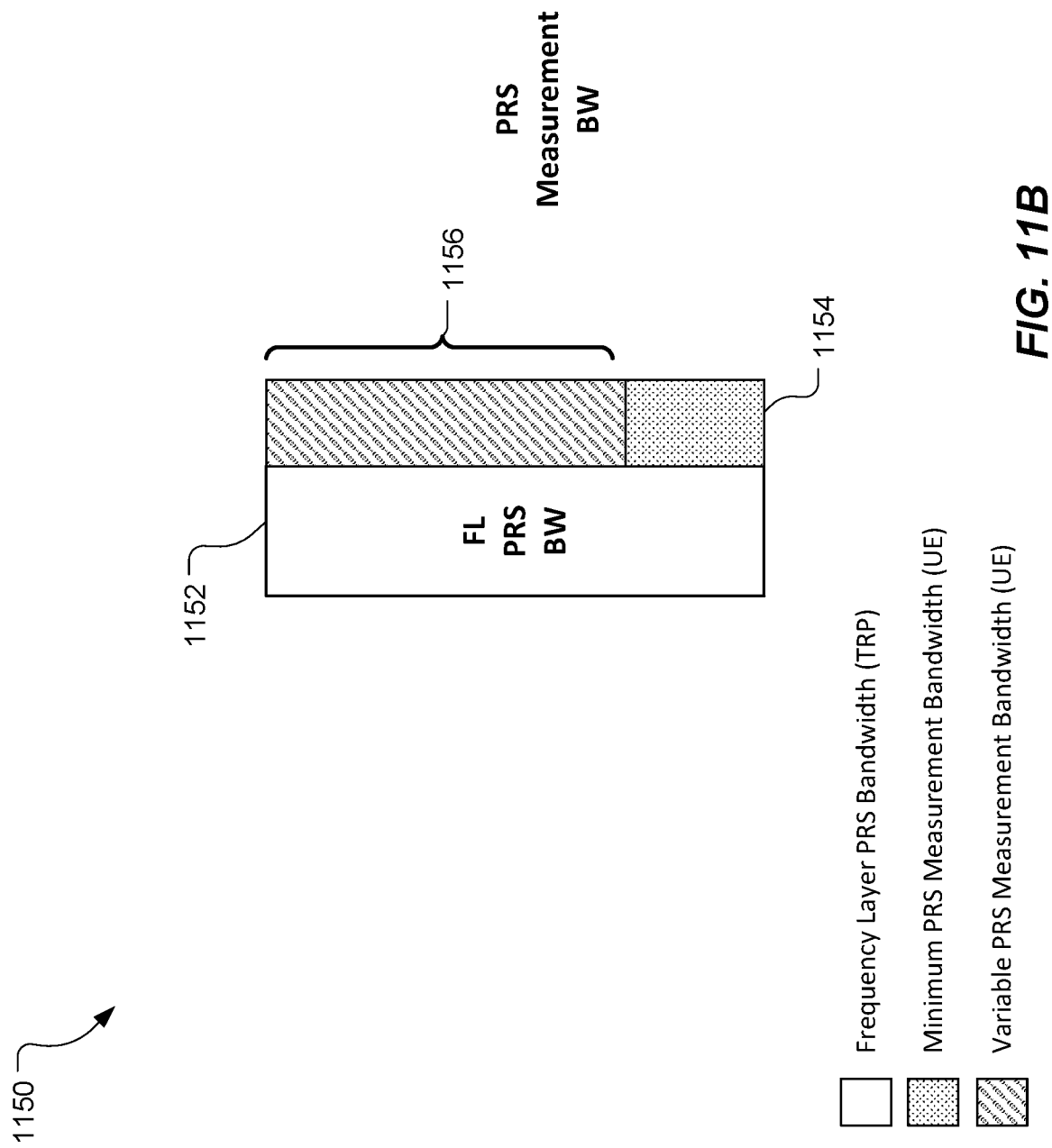
FIG. 11B is a diagram of an example of a variable positioning reference signal measurement bandwidth within a frequency layer.

Referring to FIG. 11B, a diagram 1150 of an example of a variable PRS measurement bandwidth within a frequency layer is shown. The diagram 1150 includes a PRS bandwidth 1152 in a frequency layer, and a PRS measurement bandwidth including a first portion 1154 and a second portion 1156. The first portion 1154 may represent a minimum PRS measurement bandwidth the UE 200 may configure, and the second portion 1156 may represent values of a PRS measurement bandwidths from a minimum value to a maximum value. In an example the minimum value may be zero (i.e., the size of the first portion is zero). The maximum value may be based on the frequency layer (i.e., the maximum value enables a PRS measurement bandwidth that is equal to the PRS bandwidth). In an embodiment the PRS measurement bandwidths 1104, 1106, 1108, 1110 in FIG. 11A may be realized with the variable PRS measurement bandwidth as depicted in FIG. 11B. The second portion 1156 may be configured for a range of sizes within the PRS bandwidth and thus is not limited to the four options in FIG. 11A. For example, the resolution of the potential ranges may be in 0.2, 0.5, 1.0, 1.5, 5, etc. MHz increments and thus enable a larger number of potential PRS measurement bandwidths. The quantization of the second portion 1156 may be based on the information elements available for signaling (e.g., number of bits) and the capabilities of the UE 200. In an example, the first portion 1154 and the second portion 1156 may not be continuous within the PRS bandwidth 1152. For example, the first portion 1154 may be located in the lower part of the PRS bandwidth 1152 and the second portion 1156 may be located in the upper part of the PRS bandwidth 1152. Other variations and locations within the PRS bandwidth 1152 may also be used.

Figure 12:
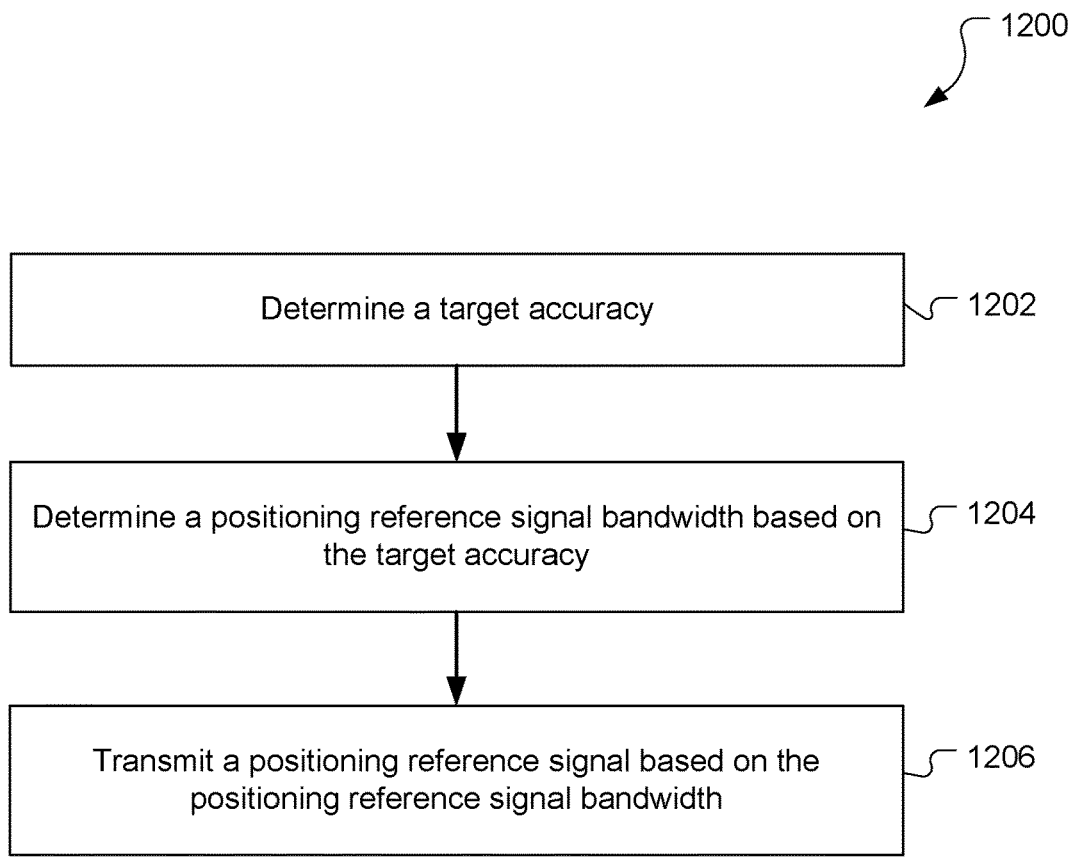
FIG. 12 is a process flow for an example method for positioning reference signal bandwidth adaptation based on a positioning quality of service.

Referring to FIG. 12, with further reference to FIGS. 1-11B, a method 1200 for positioning reference signal bandwidth adaptation based on a positioning quality of service includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes determining a target accuracy. The TRP 300 is a means for determining the target accuracy. In an example, the TRP 300 may receive the target accuracy from the LMF 120 or the UE 200. The UE 200 may be configured to operate in, and transition through, different use cases and/or applications which may require different accuracy requirements. The target accuracy may be based on a QoS requirement. For example, in regulatory use cases, the accuracy requirements may include a horizontal positioning error less than or equal to 50 meters, and commercial use cases may include a horizontal positioning error of less than 3 meters for indoor scenarios, and less than 10 meters for outdoor scenarios. Other target accuracy values may be used with other applications.

At stage 1204, the method includes determining a positioning reference signal bandwidth based on the target accuracy. The TRP 300 is a means for determining the PRS bandwidth. In an example, the LMF 120 may provide the TRP 300 with the PRS bandwidth. Referring to the example data structure 800, a positioning frequency layer may be configured with a PRS bandwidth and each PRS resource (e.g., PRS beam) in the positioning frequency layer is transmitted with the PRS bandwidth. The positioning frequency layer may be associated with a QoS accuracy requirement. The accuracy requirements may be normalized to relative bins, such as indicated in the QoS accuracy requirement column 802, and the TRP 300 may be configured to select a positioning frequency layer based on the QoS accuracy requirement. The selection of the positioning frequency layer dictates the PRS bandwidth of the PRS resources. In an example, the TRP 300 may be configured to signal a UE 200 to indicate the selected positioning frequency layer, and the UE 200 may configure a PRS measurement bandwidth based on the selected positioning frequency layer. For example, referring to FIG. 8B, the TRP 300 may signal via DCI, MAC CE, RRC, LPP, or other messaging, that the third positioning frequency layer 860 with a third PRS bandwidth is active, and the UE 200 may configure the third PRS measurement bandwidth 862. Other signaling may also be used to indicate the positioning frequency layer, and the UE 200 may be configured to select a PRS measurement bandwidth based on the indicated positioning frequency layer.

At stage 1206, the method includes transmitting a PRS based on the PRS bandwidth. The TRP 300 is a means for transmitting the PRS. The TRP 300 transmits downlink PRS resources based on the positioning frequency layer selected at stage 1204. For example, referring to FIGS. 5A and 5B, the TRP 300 may be configured to transmit PRS resource sets including a plurality of PRS resources using the PRS bandwidth.

Figure 13:
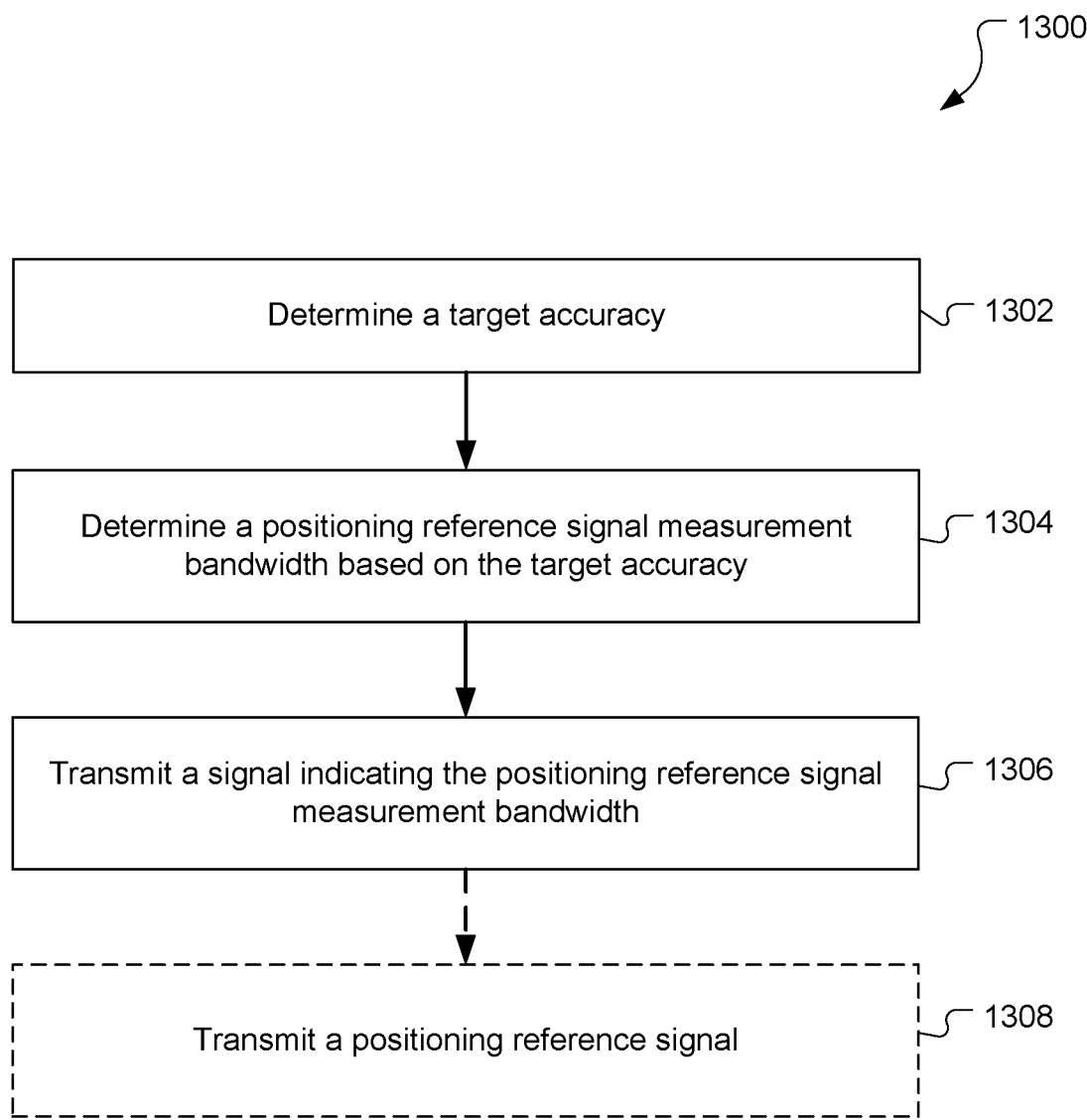
FIG. 13 is a process flow for an example method for utilizing a positioning reference signal measurement bandwidth within a frequency layer.

Referring to FIG. 13, with further reference to FIGS. 1-11B, a method 1300 for utilizing a positioning reference signal measurement bandwidth within a frequency layer includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes determining a target accuracy. The TRP 300 is a means for determining the target accuracy. In an example, the TRP 300 may receive the target accuracy from the LMF 120 or the UE 200. The UE 200 may be configured to operate in, and transition through, different use cases and/or applications which may require different accuracy requirements. The target accuracy may be based on a QoS requirement. For example, in regulatory use cases, the accuracy requirements may include a horizontal positioning error less than or equal to 50 meters, and commercial use cases may a horizontal positioning error of less than 3 meters for indoor scenarios, and less than 10 meters for outdoor scenarios. Other target accuracy values may be used with other applications.

At stage 1304, the method includes determining a positioning reference signal measurement bandwidth based on the target accuracy. The TRP 300 is a means for determining the PRS measurement bandwidth. In an example, the LMF 120 may provide the TRP 300 with the PRS measurement bandwidth. Referring to the example data structure 800, accuracy requirements may be normalized to relative bins, such as indicated in the QoS accuracy requirement column 802, and the TRP 300 may be configured to select a PRS bandwidth 806 based on the QoS accuracy requirement. In an example, the PRS measurement bandwidth may be based on the PRS bandwidth 806. For example, a medium-low QoS accuracy requirement may correspond to a PRS measurement bandwidth of 50 MHz. Other data structures may be used to correlate a QoS accuracy requirement with a PRS measurement bandwidth value. In an example, referring to FIG. 11A, the UE 200 may be configured with a plurality of pre-designated PRS measurement bandwidths 1104, 1106, 1108, 1110, and the TRP 300 may select one of the PRS measurement bandwidths based on the target accuracy. In another example, referring to FIG. 11B, the UE 200 may be configured with a variable PRS measurement bandwidth and the TRP 300 may provide an indication of the size of the variable PRS measurement bandwidth based on the target accuracy.

At stage 1306, the method includes transmitting a signal indicating the positioning reference signal measurement bandwidth. The TRP 300 is a means for transmitting a signal indicating the PRS measurement bandwidth. Referring to FIG. 9, in an example the TRP 300 may provide low level signaling 906 such as DCI or MAC CE configured to cause the UE 200 to switch from the first PRS measurement bandwidth 904 to the second PRS measurement bandwidth 908. Other signaling such as RRC or LPP may also be used to indicate the PRS measurement bandwidth. In an example, referring to FIG. 11A, the signal indicating the PRS measurement bandwidth may indicate one of a plurality of pre-designated PRS measurement bandwidths 1104, 1106, 1108, 1110. In another example, referring to FIG. 11B, the signal indicating the PRS measurement bandwidth may indicate a size of a variable PRS measurement bandwidth.

At stage 1308, the method may optionally include transmitting a PRS based on the PRS bandwidth. The TRP 300 is a means for transmitting the PRS. The TRP 300 may transmit downlink PRS resources based on the positioning frequency layer without regard to the PRS measurement bandwidth. For example, referring to FIGS. 9 and 10, the TRP 300 may be configured to transmit PRS resource sets based on different positioning frequency layers. The UE 200 may be configured to adapt the PRS measurement bandwidth based on a new frequency layer, or may maintain an existing PRS measurement bandwidth if accuracy targets are being achieved.

Figure 14:
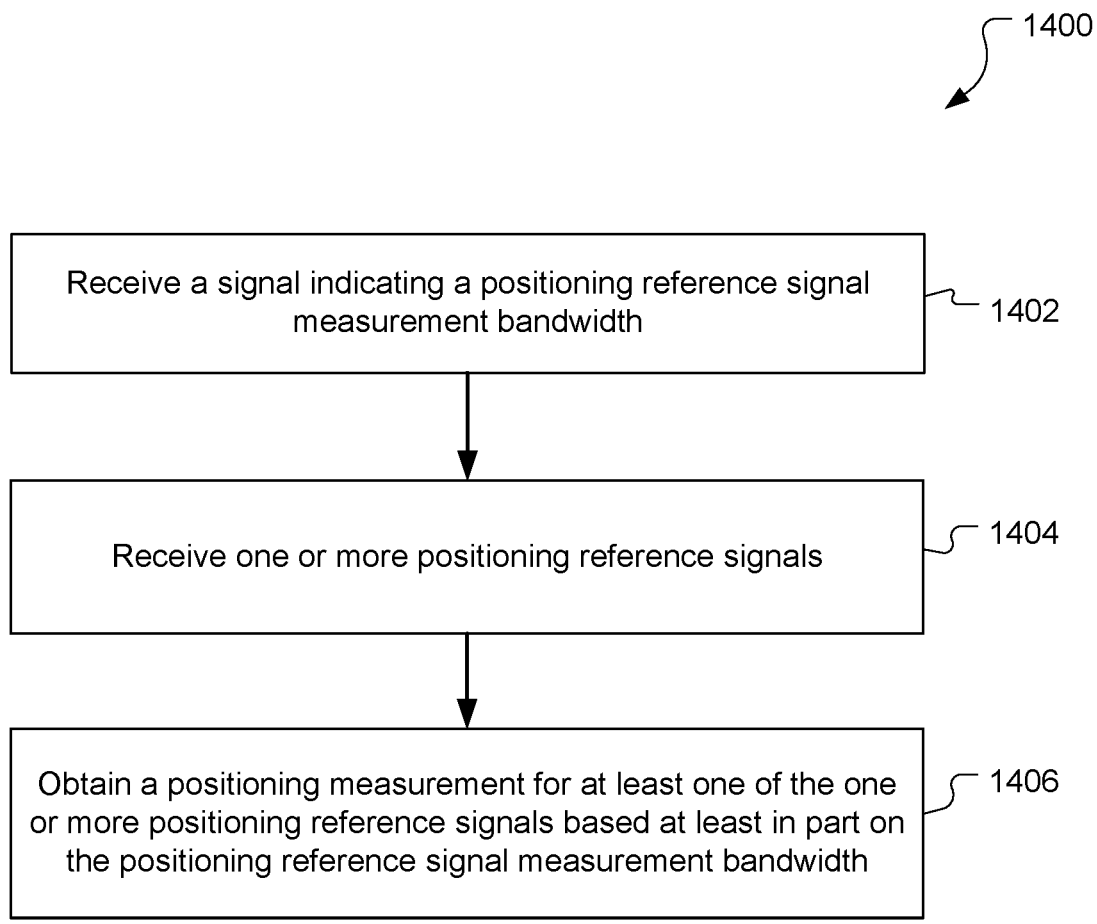
FIG. 14 is a process flow for an example method for obtaining positioning measurements within a positioning reference signal measurement bandwidth.

Referring to FIG. 14, with further reference to FIGS. 1-11B, a method 1400 for obtaining positioning measurements within a positioning reference signal measurement bandwidth includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving a signal indicating a positioning reference signal measurement bandwidth. The UE 200 is a means for receiving the signal indicating a PRS measurement bandwidth. Referring to the example data structure 800, accuracy requirements may be normalized to relative bins, such as indicated in the QoS accuracy requirement column 802, and the TRP 300 may be configured to select a PRS bandwidth 806 based on the QoS accuracy requirement. The current activity of the UE 200 (e.g., regulatory, commercial, indoor, outdoor, applications, etc.) may be used to determine to determine the QoS accuracy requirement. In an example, the PRS measurement bandwidth may correspond to one of the PRS bandwidths in the frequency layers with the desired positioning QoS. In another example, the PRS measurement bandwidths may include values that are different from PRS bandwidth values in the frequency layers. Referring to FIG. 9, in an example the TRP 300 may provide low level signaling 906 such as DCI or MAC CE configured to cause the UE 200 to switch from the first PRS measurement bandwidth 904 to the second PRS measurement bandwidth 908. Other signaling such as RRC or LPP may also be used to indicate the PRS measurement bandwidth. Referring to FIG. 11A, the received signal may be configured to enable the UE 200 to utilize one of a plurality of pre-designated PRS measurement bandwidths 1104, 1106, 1108, 1110. In another example, referring to FIG. 11B, the received signal may be configured to enable the UE 200 to utilize a variable PRS measurement bandwidth.

At stage 1404, the method includes receiving one or more positioning reference signals. The UE 200 is a means for receiving the one or more PRS. The TRP 300 may transmit downlink PRS resources based on the positioning frequency layer. For example, referring to FIGS. 9 and 10, one or more TRPs may be configured to transmit PRS resource sets based on different positioning frequency layers. The UE 200 may be configured to receive at least a portion of the transmitted PRS signals based on the PRS measurement bandwidth configured with the indication received at stage 1402. In an example, the UE 200 may be configured to select a PRS measurement bandwidth based on an application executing on the UE 200, or other QoS requirement based on the state of the UE 200.

At stage 1406, the method includes obtaining a positioning measurement for at least one of the one or more positioning reference signals based at least in part on the positioning reference signal measurement bandwidth. The UE 200 is a means for obtaining the PRS measurements. In an example, the UE 200 may be configured to obtain position measurements as a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for one or more PRSs transmitted from one or more TRPs.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for positioning reference signal bandwidth adaptation, comprising:
   determining a target accuracy;
   determining a positioning reference signal bandwidth based on the target accuracy; and
   transmitting a positioning reference signal based on the positioning reference signal bandwidth.

2. The method of clause 1 wherein the positioning reference signal bandwidth is associated with a positioning frequency layer.

3. The method of clause 1 wherein determining the target accuracy includes determining a quality of service for positioning.

4. The method of clause 1 wherein determining the target accuracy includes receiving the target accuracy from a network server.

5. The method of clause 1 further comprising providing an indication of the positioning reference signal bandwidth to a user equipment.

6. The method of clause 1 wherein providing an indication of the positioning reference signal bandwidth includes providing the indication in a downlink control information message or a medium access control (MAC) control element (CE).

7. The method of clause 1 wherein determining the positioning reference signal bandwidth includes obtaining the positioning reference signal bandwidth from a data structure.

8. A method for utilizing a positioning reference signal measurement bandwidth within a frequency layer, comprising:
   determining a target accuracy;
   determining the positioning reference signal measurement bandwidth based on the target accuracy; and
   transmitting a signal indicating the positioning reference signal measurement bandwidth.

9. The method of clause 8 wherein determining the target accuracy includes determining a quality of service for positioning.

10. The method of clause 8 wherein determining the target accuracy includes receiving the target accuracy from a network server.

11. The method of clause 8 wherein determining the target accuracy includes receiving the target accuracy from a user equipment.

12. The method of clause 8 wherein the frequency layer is associated with a plurality of positioning reference signal measurement bandwidths and the signal indicating the positioning reference signal measurement bandwidth indicates one or the plurality of positioning reference signal measurement bandwidths.

13. The method of clause 8 wherein transmitting the signal indicating the positioning reference signal measurement bandwidth includes providing an indication in a downlink control information message or a medium access control (MAC) control element (CE).

14. The method of clause 8 wherein transmitting the signal indicating the positioning reference signal measurement bandwidth includes providing an indication of a bandwidth part.

15. The method of clause 8 further comprising transmitting a positioning reference signal in a bandwidth that is larger than the positioning reference signal measurement bandwidth.

16. The method of clause 8 further comprising transmitting a positioning reference signal in a bandwidth that is equal to the positioning reference signal measurement bandwidth.

17. The method of clause 8 wherein transmitting the signal indicating the positioning reference signal measurement bandwidth includes providing an indication of one of a plurality of pre-designated positioning reference signal measurement bandwidths.

18. The method of clause 8 wherein transmitting the signal indicating the positioning reference signal measurement bandwidth includes providing an indication of a size of a variable positioning reference signal measurement bandwidth.

19. The method of clause 8 further comprising receiving a timing measurement quality and an indication of a current positioning reference signal measurement bandwidth from a user equipment.

20. A method of obtaining positioning measurements, comprising:
   receiving a signal indicating a positioning reference signal measurement bandwidth;
   receiving one or more positioning reference signals; and
   obtaining a positioning measurement for at least one of the one or more positioning reference signals based at least in part on the positioning reference signal measurement bandwidth.

21. The method of clause 20 wherein receiving the signal indicating the positioning reference signal measurement bandwidth includes receiving an indication in a downlink control information message or a medium access control (MAC) control element (CE).

22. The method of clause 20 wherein receiving the signal indicating the positioning reference signal measurement bandwidth includes receiving an indication of a bandwidth part.

23. The method of clause 20 wherein the one or more positioning reference signals have a bandwidth that is larger than the positioning reference signal measurement bandwidth.

24. The method of clause 20 wherein the one or more positioning reference signals have a bandwidth that is equal to the positioning reference signal measurement bandwidth.

25. The method of clause 20 wherein receiving the signal indicating the positioning reference signal measurement bandwidth includes receiving an indication of one of a plurality of pre-designated positioning reference signal measurement bandwidths.

26. The method of clause 20 wherein receiving the signal indicating the positioning reference signal measurement bandwidth includes receiving an indication of a size of a variable positioning reference signal measurement bandwidth.

27. The method of clause 20 further comprising transmitting a timing measurement quality and an indication of a current positioning reference signal measurement bandwidth to a base station.

28. The method of clause 20 wherein the positioning reference signal measurement bandwidth and the one or more positioning reference signals are associated with a frequency layer.

29. The method of clause 20 further comprising transmitting a quality of service indication to a base station.

30. An apparatus, comprising:
a memory;
at least one transceiver;
at least one processor communicatively coupled to the memory and the at least one transceiver and configured to:
determine a target accuracy;
determine a positioning reference signal bandwidth based on the target accuracy; and
transmit a positioning reference signal based on the positioning reference signal bandwidth.

31. The apparatus of clause 30 wherein the positioning reference signal bandwidth is associated with a positioning frequency layer.

32. The apparatus of clause 30 wherein the at least one processor is further configured to determine a quality of service for positioning.

33. The apparatus of clause 30 wherein the at least one processor is further configured to receive the target accuracy from a network server.

34. The apparatus of clause 30 wherein the at least one processor is further configured to provide an indication of the positioning reference signal bandwidth to a user equipment.

35. The apparatus of clause 34 wherein the at least one processor is further configured to provide the indication in a downlink control information message or a medium access control (MAC) control element (CE).

36. The apparatus of clause 30 wherein the at least one processor is further configured to obtain the positioning reference signal bandwidth from a data structure.

37. An apparatus, comprising:
a memory;
at least one transceiver;
at least one processor communicatively coupled to the memory and the at least one transceiver and configured to:
determine a target accuracy;
determine a positioning reference signal measurement bandwidth based on the target accuracy; and
transmit a signal indicating the positioning reference signal measurement bandwidth.

38. The apparatus of clause 37 wherein the at least one processor is further configured to determine a quality of service for positioning.

39. The apparatus of clause 37 wherein the at least one processor is further configured to receive the target accuracy from a network server.

40. The apparatus of clause 37 wherein the at least one processor is further configured to receive the target accuracy from a user equipment.

41. The apparatus of clause 37 wherein a frequency layer is associated with a plurality of positioning reference signal measurement bandwidths and the signal indicating the positioning reference signal measurement bandwidth indicates one or the plurality of positioning reference signal measurement bandwidths.

42. The apparatus of clause 37 wherein the at least one processor is further configured to provide an indication in a downlink control information message or a medium access control (MAC) control element (CE).

43. The apparatus of clause 37 wherein the at least one processor is further configured to provide an indication of a bandwidth part.

44. The apparatus of clause 37 wherein the at least one processor is further configured to transmit a positioning reference signal in a bandwidth that is larger than the positioning reference signal measurement bandwidth.

45. The apparatus of clause 37 wherein the at least one processor is further configured to transmit a positioning reference signal in a bandwidth that is equal to the positioning reference signal measurement bandwidth.

46. The apparatus of clause 37 wherein the at least one processor is further configured to provide an indication of one of a plurality of pre-designated positioning reference signal measurement bandwidths.

47. The apparatus of clause 37 wherein the at least one processor is further configured to provide an indication of a size of a variable positioning reference signal measurement bandwidth.

48. The apparatus of clause 37 wherein the at least one processor is further configured to receive a timing measurement quality and an indication of a current positioning reference signal measurement bandwidth from a user equipment.

49. An apparatus, comprising:
a memory;
at least one transceiver;
at least one processor communicatively coupled to the memory and the at least one transceiver and configured to:
receive a signal indicating a positioning reference signal measurement bandwidth;
receive one or more positioning reference signals; and
obtain a positioning measurement for at least one of the one or more positioning reference signals based at least in part on the positioning reference signal measurement bandwidth.

50. The apparatus of clause 49 wherein the at least one processor is further configured to receive an indication in a downlink control information message or a medium access control (MAC) control element (CE).

51. The apparatus of clause 49 wherein the at least one processor is further configured to receive an indication of a bandwidth part.

52. The apparatus of clause 49 wherein the one or more positioning reference signals have a bandwidth that is larger than the positioning reference signal measurement bandwidth.

53. The apparatus of clause 49 wherein the one or more positioning reference signals have a bandwidth that is equal to the positioning reference signal measurement bandwidth.

54. The apparatus of clause 49 wherein the at least one processor is further configured to receive an indication of one of a plurality of pre-designated positioning reference signal measurement bandwidths.

55. The apparatus of clause 49 wherein the at least one processor is further configured to receive an indication of a size of a variable positioning reference signal measurement bandwidth.

56. The apparatus of clause 49 wherein the at least one processor is further configured to transmit a timing measurement quality and an indication of a current positioning reference signal measurement bandwidth to a base station.

57. The apparatus of clause 49 wherein the positioning reference signal measurement bandwidth and the one or more positioning reference signals are associated with a frequency layer.

58. The apparatus of clause 49 wherein the at least one processor is further configured to transmit a quality of service indication to a base station.

59. An apparatus for positioning reference signal bandwidth adaptation, comprising:
    means for determining a target accuracy;
    means for determining a positioning reference signal bandwidth based on the target accuracy; and
    means for transmitting a positioning reference signal based on the positioning reference signal bandwidth.

60. An apparatus for utilizing a positioning reference signal measurement bandwidth within a frequency layer, comprising:
    means for determining a target accuracy;
    means for determining the positioning reference signal measurement bandwidth based on the target accuracy; and
    means for transmitting a signal indicating the positioning reference signal measurement bandwidth.

61. An apparatus of obtaining positioning measurements, comprising:
    means for receiving a signal indicating a positioning reference signal measurement bandwidth;
    means for receiving one or more positioning reference signals; and
    means for obtaining a positioning measurement for at least one of the one or more positioning reference signals based at least in part on the positioning reference signal measurement bandwidth.

62. A non-transitory processor-readable storage medium comprising processor-readable instructions configured to cause one or more processors to adapt a positioning reference signal bandwidth, comprising:
    code for determining a target accuracy;
    code for determining a positioning reference signal bandwidth based on the target accuracy; and
    code for transmitting a positioning reference signal based on the positioning reference signal bandwidth.

63. A non-transitory processor-readable storage medium comprising processor-readable instructions configured to cause one or more processors to utilize a positioning reference signal measurement bandwidth within a frequency layer, comprising:
    code for determining a target accuracy;
    code for determining the positioning reference signal measurement bandwidth based on the target accuracy; and
    code for transmitting a signal indicating the positioning reference signal measurement bandwidth.

64. A non-transitory processor-readable storage medium comprising processor-readable instructions configured to cause one or more processors to obtain positioning measurements, comprising:
    code for receiving a signal indicating a positioning reference signal measurement bandwidth;
    code for receiving one or more positioning reference signals; and
    code for obtaining a positioning measurement for at least one of the one or more positioning reference signals based at least in part on the positioning reference signal measurement bandwidth.

The invention claimed is:

1. A method for positioning reference signal bandwidth adaptation, comprising:
    determining a target user equipment (UE) positioning accuracy;
    determining a positioning frequency layer and a positioning reference signal bandwidth based on the target UE positioning accuracy;
    transmitting a positioning reference signal using the positioning frequency layer based on the positioning reference signal bandwidth;
    detecting a change of status of the UE resulting in a lower target UE positioning accuracy; and
    transmitting, to the UE based on the lower target UE positioning accuracy, a signal configured to enable the UE to reduce a positioning reference signal measurement bandwidth of the UE for the positioning frequency layer.

2. The method of claim 1 wherein the positioning reference signal bandwidth is associated with a positioning frequency layer.

3. The method of claim 1 wherein determining the target accuracy includes determining a quality of service for positioning.

4. The method of claim 1 wherein determining the target accuracy includes receiving the target accuracy from a network server.

5. The method of claim 1 further comprising providing an indication of the positioning reference signal bandwidth to a user equipment.

6. The method of claim 1 wherein providing an indication of the positioning reference signal bandwidth includes providing the indication in a downlink control information message or a medium access control (MAC) control element (CE).

7. The method of claim 1 wherein determining the positioning reference signal bandwidth includes obtaining the positioning reference signal bandwidth from a data structure.

8. A method of obtaining positioning measurements, comprising:
    receiving a signal indicating a positioning frequency layer and a first positioning reference signal measurement bandwidth;
    receiving one or more positioning reference signals;
    obtaining a positioning measurement for at least one of the one or more positioning reference signals based at least in part on the first positioning reference signal measurement bandwidth;
    changing status resulting in a lower positioning accuracy requirement; and
    measuring one or more positioning reference signals of the positioning frequency layer using, based on receiving an instruction signal based on the lower positioning accuracy requirement, a second positioning signal measurement bandwidth that is smaller than the first positioning signal measurement bandwidth.

9. The method of claim 8 wherein receiving the signal indicating the positioning reference signal measurement bandwidth includes receiving an indication in a downlink control information message or a medium access control (MAC) control element (CE).

10. The method of claim 8 wherein receiving the signal indicating the positioning reference signal measurement bandwidth includes receiving an indication of a bandwidth part.

11. The method of claim 8 wherein the one or more positioning reference signals have a bandwidth that is larger than the positioning reference signal measurement bandwidth.

12. The method of claim 8 wherein the one or more positioning reference signals have a bandwidth that is equal to the positioning reference signal measurement bandwidth.

13. The method of claim 8 wherein receiving the signal indicating the positioning reference signal measurement bandwidth includes receiving an indication of one of a plurality of pre-designated positioning reference signal measurement bandwidths.

14. The method of claim 8 wherein receiving the signal indicating the positioning reference signal measurement bandwidth includes receiving an indication of a size of a variable positioning reference signal measurement bandwidth.

15. The method of claim 8 further comprising transmitting a timing measurement quality and an indication of a current positioning reference signal measurement bandwidth to a base station.

16. The method of claim 8 wherein the positioning reference signal measurement bandwidth and the one or more positioning reference signals are associated with a frequency layer.

17. The method of claim 8 further comprising transmitting a quality of service indication to a base station.

18. An apparatus, comprising:
a memory;
at least one transceiver;
at least one processor communicatively coupled to the memory and the at least one transceiver and configured to:
  determine a target user equipment (UE) positioning accuracy;
  determine a positioning frequency layer and a positioning reference signal bandwidth based on the target UE positioning accuracy;
  transmit a positioning reference signal using the positioning frequency layer based on the positioning reference signal bandwidth;
  detect a change of status of the UE resulting in a lower target UE positioning accuracy; and
  transmit, to the UE based on the lower target UE positioning accuracy, a signal configured to enable the UE to reduce a positioning reference signal measurement bandwidth of the UE for the positioning frequency layer.

19. The apparatus of claim 18 wherein the positioning reference signal bandwidth is associated with a positioning frequency layer.

20. The apparatus of claim 18 wherein the at least one processor is further configured to determine a quality of service for positioning.

21. The apparatus of claim 18 wherein the at least one processor is further configured to receive the target accuracy from a network server.

22. The apparatus of claim 18 wherein the at least one processor is further configured to provide an indication of the positioning reference signal bandwidth to a user equipment.

23. The apparatus of claim 22 wherein the at least one processor is further configured to provide the indication in a downlink control information message or a medium access control (MAC) control element (CE).

24. The apparatus of claim 18 wherein the at least one processor is further configured to obtain the positioning reference signal bandwidth from a data structure.

25. An apparatus, comprising:
a memory;
at least one transceiver;
at least one processor communicatively coupled to the memory and the at least one transceiver and configured to:
  receive a signal indicating a positioning frequency layer and a first positioning reference signal measurement bandwidth;
  receive one or more positioning reference signals;
  obtain a positioning measurement for at least one of the one or more positioning reference signals based at least in part on the first positioning reference signal measurement bandwidth;
  change status resulting in a lower positioning accuracy requirement; and
  measure one or more positioning reference signals of the positioning frequency layer using, based on receiving an instruction signal based on the lower positioning accuracy requirement, a second positioning signal measurement bandwidth that is smaller than the first positioning signal measurement bandwidth.

26. The apparatus of claim 25 wherein the at least one processor is further configured to receive an indication in a downlink control information message or a medium access control (MAC) control element (CE).

27. The apparatus of claim 25 wherein the at least one processor is further configured to receive an indication of a bandwidth part.

28. The apparatus of claim 25 wherein the at least one processor is further configured to receive an indication of one of a plurality of pre-designated positioning reference signal measurement bandwidths.

29. The apparatus of claim 25 wherein the positioning reference signal measurement bandwidth and the one or more positioning reference signals are associated with a frequency layer.

30. The apparatus of claim 25 wherein the at least one processor is further configured to transmit a quality of service indication to a base station.

* * * * *